United States Patent
Chuang et al.

(10) Patent No.: US 11,115,067 B2
(45) Date of Patent: Sep. 7, 2021

(54) MULTI-BAND LINEARIZATION SYSTEM

(71) Applicant: NanoSemi, Inc., Waltham, MA (US)

(72) Inventors: Kevin Chuang, Cambridge, MA (US);
Alexandre Megretski, Concord, MA (US); Yan Li, Lexington, MA (US);
Helen H. Kim, Sudbury, MA (US)

(73) Assignee: NanoSemi, Inc., Waltham, MA (US)

( * ) Notice: Subject to any disclaimer, the term of this patent is extended or adjusted under 35 U.S.C. 154(b) by 398 days.

(21) Appl. No.: 16/004,713

(22) Filed: Jun. 11, 2018

(65) Prior Publication Data

US 2019/0260402 A1  Aug. 22, 2019

Related U.S. Application Data

(60) Provisional application No. 62/517,460, filed on Jun. 9, 2017.

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC .......... H04B 1/0475; H04B 2001/0425; H04B 2001/0433

(Continued)

(56) References Cited

U.S. PATENT DOCUMENTS

| 4,979,126 | A | 12/1990 | Pao et al. |
| 5,819,165 | A | 10/1998 | Hulkko et al. |

(Continued)

FOREIGN PATENT DOCUMENTS

| CN | 101379718 A | 3/2009 |
| CN | 101971507 A | 2/2011 |

(Continued)

OTHER PUBLICATIONS

Aguirre, et al., "On the Interpretation and Practice of Dynamical Differences Between Hammerstein and Wiener Models", IEEE Proceedings on Control TheoryAppl; vol. 152, No. 4, Jul. 2005, pp. 349-356.

(Continued)

*Primary Examiner* — Jinsong Hu
*Assistant Examiner* — Rui M Hu
(74) *Attorney, Agent, or Firm* — Occhiuti & Rohlicek LLP

(57) ABSTRACT

Disclosed are implementations, including a method for digital predistortion of multiband signals that includes receiving an input signal comprising multiple signal portions in different frequency bands, the input signal configured to be processed by a transmit chain, of a power amplification system, comprising at least a power amplifier that produces output with non-linear distortions, with the non-linear distortions of the transmit chain being represented using a set of basis functions derived according to a single-band model of the non-linear distortions. The method further includes performing digital predistortion on signal components derived from the multiple signal portions of the input signal using a reduced set of the basis functions that excludes at least some basis functions for at least some cross-terms resulting from a full expansion of the single-band model applied to the multiple signal portions, to produce a digital predistorted signal provided to the transmit chain.

35 Claims, 8 Drawing Sheets

(58) Field of Classification Search
USPC .................................................... 455/114.3
See application file for complete search history.

(56) References Cited

U.S. PATENT DOCUMENTS

| | | | |
|---|---|---|---|
| 5,980,457 A | 11/1999 | Averkiou | |
| 6,052,412 A | 4/2000 | Ruether et al. | |
| 6,240,278 B1 | 5/2001 | Midya et al. | |
| 6,288,610 B1 | 9/2001 | Miyashita | |
| 6,549,067 B1 * | 4/2003 | Kenington | H03F 1/3247 330/149 |
| 7,142,615 B2 * | 11/2006 | Hongo | H03F 1/3247 375/297 |
| 7,170,344 B2 * | 1/2007 | Suzuki | H03F 1/3241 330/149 |
| 7,289,773 B2 | 10/2007 | Braithwaite | |
| 7,295,815 B1 | 11/2007 | Wright et al. | |
| 7,321,264 B2 * | 1/2008 | Kokkeler | H03F 1/3247 330/149 |
| 7,333,557 B2 | 2/2008 | Rashev et al. | |
| 7,469,491 B2 | 12/2008 | McCallister et al. | |
| 7,529,652 B1 | 5/2009 | Gahinet et al. | |
| 7,577,211 B2 * | 8/2009 | Braithwaite | H03F 1/3247 375/296 |
| 7,599,431 B1 | 10/2009 | Anderson et al. | |
| 7,634,238 B2 * | 12/2009 | Suzuki | H03F 1/3252 455/105 |
| 7,796,960 B1 * | 9/2010 | Rashev | H03F 1/3258 455/114.3 |
| 7,904,033 B1 | 3/2011 | Wright et al. | |
| 8,121,560 B1 | 2/2012 | Anaraki et al. | |
| 8,185,066 B2 | 5/2012 | Camp, Jr. et al. | |
| 8,306,149 B2 * | 11/2012 | Mujica | H04L 27/368 375/296 |
| 8,391,809 B1 * | 3/2013 | Fuller | H04B 1/0475 455/114.3 |
| 8,411,730 B2 | 4/2013 | Maeda | |
| 8,446,979 B1 | 5/2013 | Yee | |
| 8,498,590 B1 | 7/2013 | Rashev et al. | |
| 8,519,789 B2 | 8/2013 | Hawkes | |
| 8,576,941 B2 | 11/2013 | Bai | |
| 8,644,437 B2 | 2/2014 | Kim et al. | |
| 8,666,336 B1 * | 3/2014 | Dick | H04B 17/11 455/114.3 |
| 8,711,976 B2 | 4/2014 | Chandrasekaran | |
| 8,731,005 B2 | 5/2014 | Schlee | |
| 8,731,105 B2 | 5/2014 | Bai | |
| 8,890,609 B2 | 11/2014 | Laporte | |
| 9,071,207 B2 * | 6/2015 | Bai | H03F 3/195 |
| 9,130,628 B1 | 9/2015 | Mittal et al. | |
| 9,173,173 B2 | 10/2015 | Wei et al. | |
| 9,184,710 B2 | 11/2015 | Braithwaite | |
| 9,226,189 B1 | 12/2015 | Kularatna et al. | |
| 9,252,712 B2 | 2/2016 | Li et al. | |
| 9,331,882 B2 | 5/2016 | Fehri et al. | |
| 9,337,782 B1 | 5/2016 | Mauer et al. | |
| 9,564,876 B2 | 2/2017 | Kim et al. | |
| 9,590,668 B1 | 3/2017 | Kim et al. | |
| 9,595,920 B2 | 3/2017 | Li et al. | |
| 9,614,557 B1 | 4/2017 | Mayer et al. | |
| 9,621,236 B2 * | 4/2017 | Ghannouchi | H04B 7/0639 |
| 9,628,119 B2 | 4/2017 | Gal et al. | |
| 9,722,646 B1 * | 8/2017 | Matthews | H03F 3/195 |
| 9,749,161 B1 | 8/2017 | Gal et al. | |
| 9,831,899 B1 | 11/2017 | Boghrat et al. | |
| 9,935,810 B1 | 4/2018 | Hammler et al. | |
| 9,973,370 B1 | 5/2018 | Langer et al. | |
| 10,033,413 B2 | 7/2018 | Pratt | |
| 10,033,414 B2 * | 7/2018 | Ota | H04B 1/0475 |
| 10,079,699 B1 | 9/2018 | Li et al. | |
| 10,080,178 B2 | 9/2018 | Stapleton et al. | |
| 10,141,896 B2 | 11/2018 | Huang | |
| 10,141,961 B1 | 11/2018 | Huang et al. | |
| 10,181,914 B2 | 1/2019 | Li et al. | |
| 10,404,296 B2 | 9/2019 | Kim et al. | |
| 10,447,511 B2 | 10/2019 | Xie et al. | |
| 10,469,109 B2 | 11/2019 | Gutman et al. | |
| 10,523,159 B2 | 12/2019 | Megretski et al. | |
| 10,581,470 B2 | 3/2020 | Megretski et al. | |
| 10,623,118 B2 | 4/2020 | Lagoy et al. | |
| 10,644,657 B1 | 5/2020 | Megretski et al. | |
| 10,763,904 B2 | 9/2020 | Megretski et al. | |
| 10,812,166 B2 | 10/2020 | Kim et al. | |
| 10,826,739 B1 | 11/2020 | Fomin et al. | |
| 2001/0050592 A1 | 12/2001 | Wright et al. | |
| 2002/0080891 A1 | 6/2002 | Ahn et al. | |
| 2003/0058960 A1 | 3/2003 | Lee | |
| 2003/0184374 A1 | 10/2003 | Huang et al. | |
| 2003/0207680 A1 | 11/2003 | Yang et al. | |
| 2004/0076247 A1 | 4/2004 | Barak et al. | |
| 2004/0116083 A1 | 6/2004 | Suzuki et al. | |
| 2004/0121741 A1 | 6/2004 | Rashev et al. | |
| 2004/0142667 A1 | 7/2004 | Lochhead et al. | |
| 2004/0196922 A1 | 10/2004 | Leffel | |
| 2005/0001684 A1 | 1/2005 | Braithwaite | |
| 2005/0163251 A1 | 7/2005 | McCallister | |
| 2005/0163252 A1 * | 7/2005 | McCallister | H03F 1/3247 375/296 |
| 2005/0180527 A1 | 8/2005 | Suzuki et al. | |
| 2005/0190857 A1 | 9/2005 | Braithwaite | |
| 2006/0022751 A1 | 2/2006 | Fuller et al. | |
| 2006/0154622 A1 | 7/2006 | Piirainen | |
| 2006/0229036 A1 | 10/2006 | Muller et al. | |
| 2006/0276147 A1 | 12/2006 | Suzuki | |
| 2007/0091992 A1 | 4/2007 | Dowling | |
| 2007/0230557 A1 | 10/2007 | Balasubramonian et al. | |
| 2007/0241812 A1 | 10/2007 | Yang et al. | |
| 2008/0003945 A1 | 1/2008 | Wenham | |
| 2008/0019453 A1 | 1/2008 | Zhao et al. | |
| 2008/0039045 A1 | 2/2008 | Filipovic et al. | |
| 2008/0057882 A1 | 3/2008 | Singerl | |
| 2008/0101502 A1 | 5/2008 | Navidpour et al. | |
| 2008/0247487 A1 | 10/2008 | Cai et al. | |
| 2008/0260066 A1 * | 10/2008 | Cai | H03F 1/3294 375/297 |
| 2008/0268794 A1 | 10/2008 | Mege et al. | |
| 2008/0268795 A1 | 10/2008 | Saed | |
| 2008/0285640 A1 | 11/2008 | McCallister | |
| 2009/0201084 A1 | 8/2009 | See et al. | |
| 2010/0026354 A1 | 2/2010 | Utsunomiya et al. | |
| 2010/0048149 A1 | 2/2010 | Tang et al. | |
| 2010/0225390 A1 | 9/2010 | Brown et al. | |
| 2010/0297966 A1 * | 11/2010 | Row | H03F 3/24 455/114.3 |
| 2011/0044158 A1 | 2/2011 | Tao et al. | |
| 2011/0085490 A1 | 4/2011 | Schlee | |
| 2011/0098011 A1 | 4/2011 | Camp, Jr. et al. | |
| 2011/0128992 A1 | 6/2011 | Maeda et al. | |
| 2011/0135035 A1 | 6/2011 | Bose et al. | |
| 2011/0150130 A1 | 6/2011 | Kenington | |
| 2011/0163806 A1 | 7/2011 | Hongo | |
| 2011/0187437 A1 | 8/2011 | Perreault et al. | |
| 2011/0235734 A1 | 9/2011 | Kenington | |
| 2011/0255627 A1 | 10/2011 | Gotman et al. | |
| 2011/0273234 A1 | 11/2011 | Van der Heijen et al. | |
| 2011/0273236 A1 | 11/2011 | Heijden et al. | |
| 2012/0093210 A1 | 4/2012 | Schmidt et al. | |
| 2012/0108189 A1 | 5/2012 | McCallister et al. | |
| 2012/0119810 A1 | 5/2012 | Bai | |
| 2012/0119811 A1 | 5/2012 | Bai et al. | |
| 2012/0119831 A1 | 5/2012 | Bai | |
| 2012/0147993 A1 * | 6/2012 | Kim | H04W 72/0453 375/297 |
| 2012/0154033 A1 | 6/2012 | Lozhkin | |
| 2012/0154430 A1 | 6/2012 | Matsushima et al. | |
| 2012/0176195 A1 | 7/2012 | Dawson et al. | |
| 2012/0194271 A1 | 8/2012 | Yamamoto et al. | |
| 2012/0200355 A1 | 8/2012 | Braithwaite | |
| 2012/0219048 A1 | 8/2012 | Camuffo et al. | |
| 2012/0286865 A1 | 11/2012 | Chandrasekaran | |
| 2012/0286985 A1 | 11/2012 | Chandrasekaran et al. | |
| 2012/0293252 A1 | 11/2012 | Sorrells et al. | |
| 2012/0295558 A1 | 11/2012 | Wang et al. | |

(56) References Cited

U.S. PATENT DOCUMENTS

| | | |
|---|---|---|
| 2013/0033317 A1 | 2/2013 | Hawkes |
| 2013/0034188 A1 | 2/2013 | Rashev et al. |
| 2013/0044791 A1 | 2/2013 | Rimini et al. |
| 2013/0064325 A1* | 3/2013 | Kilambi ............... H03F 1/3247 375/297 |
| 2013/0094610 A1 | 4/2013 | Ghannouchi et al. |
| 2013/0094612 A1 | 4/2013 | Kim et al. |
| 2013/0163512 A1 | 6/2013 | Rexberg et al. |
| 2013/0243121 A1* | 9/2013 | Bai ........................ H03F 3/245 375/297 |
| 2013/0251065 A1 | 9/2013 | Bai |
| 2013/0259159 A1 | 10/2013 | McCallister et al. |
| 2013/0329833 A1 | 12/2013 | Bai |
| 2014/0009225 A1* | 1/2014 | Laporte ................ H03F 1/3247 330/103 |
| 2014/0016725 A1 | 1/2014 | Peroulas et al. |
| 2014/0038659 A1 | 2/2014 | Wei et al. |
| 2014/0139286 A1 | 5/2014 | Laporte |
| 2014/0161159 A1 | 6/2014 | Black et al. |
| 2014/0161207 A1 | 6/2014 | Teterwak |
| 2014/0177695 A1 | 6/2014 | Cha et al. |
| 2014/0187182 A1 | 7/2014 | Yan et al. |
| 2014/0254716 A1 | 9/2014 | Zhou et al. |
| 2014/0274105 A1 | 9/2014 | Wang |
| 2014/0292579 A1 | 10/2014 | Oh et al. |
| 2014/0347126 A1 | 11/2014 | Laporte et al. |
| 2015/0043313 A1 | 2/2015 | Stranczl et al. |
| 2015/0043323 A1 | 2/2015 | Choi et al. |
| 2015/0043678 A1 | 2/2015 | Hammi |
| 2015/0049841 A1* | 2/2015 | Laporte .................... H03F 1/34 375/297 |
| 2015/0061761 A1 | 3/2015 | Wills et al. |
| 2015/0103952 A1 | 4/2015 | Wang et al. |
| 2015/0123735 A1 | 5/2015 | Wimpenny |
| 2015/0124907 A1 | 5/2015 | Li et al. |
| 2015/0171768 A1 | 6/2015 | Perreault |
| 2015/0325913 A1 | 11/2015 | Vagman |
| 2015/0326349 A1 | 11/2015 | Yang et al. |
| 2015/0333781 A1 | 11/2015 | Alon et al. |
| 2015/0357975 A1 | 12/2015 | Avniel et al. |
| 2015/0358039 A1 | 12/2015 | Xiong et al. |
| 2015/0381216 A1 | 12/2015 | Shor et al. |
| 2015/0381220 A1* | 12/2015 | Gal ....................... H04B 1/0475 375/296 |
| 2016/0013820 A1 | 1/2016 | Yamanouchi |
| 2016/0028433 A1 | 1/2016 | Ding et al. |
| 2016/0043753 A1 | 2/2016 | Jungnickel et al. |
| 2016/0065147 A1 | 3/2016 | Pratt et al. |
| 2016/0087604 A1 | 3/2016 | Kim et al. |
| 2016/0094253 A1 | 3/2016 | Weber et al. |
| 2016/0095110 A1 | 3/2016 | Li et al. |
| 2016/0100180 A1 | 4/2016 | Oh |
| 2016/0112222 A1 | 4/2016 | Pashay-Kojouri et al. |
| 2016/0174118 A1 | 6/2016 | Duan et al. |
| 2016/0191020 A1 | 6/2016 | Velazquez |
| 2016/0211577 A1 | 7/2016 | Miller et al. |
| 2016/0241277 A1 | 8/2016 | Rexberg et al. |
| 2016/0249300 A1 | 8/2016 | Tsai et al. |
| 2016/0285485 A1* | 9/2016 | Fehri ..................... H03F 1/3247 |
| 2016/0308577 A1 | 10/2016 | Molina et al. |
| 2016/0336906 A1* | 11/2016 | Lee .......................... H03F 1/02 |
| 2016/0373072 A1 | 12/2016 | Magesacher et al. |
| 2017/0005627 A1 | 1/2017 | Zhao et al. |
| 2017/0033969 A1 | 2/2017 | Yang et al. |
| 2017/0041124 A1 | 2/2017 | Khandani |
| 2017/0047899 A1* | 2/2017 | Abdelrahman ....... H03F 1/3247 |
| 2017/0077981 A1 | 3/2017 | Tobisu et al. |
| 2017/0176507 A1 | 6/2017 | O'Keeffe et al. |
| 2017/0214438 A1* | 7/2017 | Ghannouchi ......... H04B 7/0417 |
| 2017/0237455 A1 | 8/2017 | Ye et al. |
| 2017/0244582 A1 | 8/2017 | Gal et al. |
| 2017/0302233 A1 | 10/2017 | Huang |
| 2017/0338841 A1* | 11/2017 | Pratt ................ H04L 25/03159 |
| 2018/0097530 A1 | 4/2018 | Yang et al. |
| 2018/0159568 A1* | 6/2018 | Matsuura ............... H04B 1/006 |
| 2018/0167092 A1 | 6/2018 | Hausmair et al. |
| 2018/0191537 A1* | 7/2018 | Xiong ................... H04B 1/005 |
| 2018/0287569 A1 | 10/2018 | Xu et al. |
| 2018/0337700 A1 | 11/2018 | Huang et al. |
| 2019/0007075 A1 | 1/2019 | Kim et al. |
| 2019/0097662 A1 | 3/2019 | Hornbuckle et al. |
| 2019/0104000 A1 | 4/2019 | Xie et al. |
| 2019/0238204 A1 | 8/2019 | Kim et al. |
| 2019/0260401 A1 | 8/2019 | Megretski et al. |
| 2019/0260402 A1 | 8/2019 | Chuang et al. |
| 2019/0348956 A1 | 11/2019 | Megretski et al. |
| 2019/0363676 A1 | 11/2019 | Megretski et al. |
| 2019/0363742 A1 | 11/2019 | Megretski et al. |
| 2020/0028476 A1 | 1/2020 | Kim et al. |
| 2020/0067543 A1 | 2/2020 | Kim et al. |
| 2020/0119755 A1 | 4/2020 | Mahmood et al. |

FOREIGN PATENT DOCUMENTS

| | | |
|---|---|---|
| CN | 104796170 A | 7/2015 |
| CN | 104871433 A | 8/2015 |
| CN | 105634539 A | 6/2016 |
| CN | 106464280 A | 2/2017 |
| EP | 0916967 A2 | 5/1999 |
| EP | 1560329 A1 | 8/2005 |
| EP | 1732208 A1 | 12/2006 |
| EP | 2991221 A1 | 3/2016 |
| JP | 2005-065211 A | 3/2005 |
| JP | 2010-136123 A | 6/2010 |
| JP | 2013-542696 A | 11/2013 |
| JP | 2014-533017 A | 12/2014 |
| KR | 20100040497 A | 4/2010 |
| WO | 20120154430 A1 | 11/2012 |
| WO | 2015107392 A1 | 7/2015 |
| WO | 2018156932 A1 | 8/2018 |
| WO | 2018227093 A1 | 12/2018 |
| WO | 2018227111 A1 | 12/2018 |
| WO | 2019/014422 A1 | 1/2019 |
| WO | 2019031714 A1 | 2/2019 |
| WO | 2019070573 A1 | 4/2019 |
| WO | 2019094713 A1 | 5/2019 |
| WO | 2019094720 A1 | 5/2019 |

OTHER PUBLICATIONS

Barradas, et al. "Polynomials and LUTs in PA Behavioral Modeling: A Fair Theoretical Comparison", IEEE Transactions on Microwave Theory and Techniques; vol. 62, No. 12, Dec. 2014, pp. 3274-3285.

Bosch et al. "Measurement and Simulation of Memory Effects in Predistortion Linearizers," IEEE Transactions on Microwave Theory and Techniques; vol. 37.No. 12; Dec. 1989, pp. 1885-1890.

Braithwaite, et al. "Closed-Loop Digital Predistortion (DPD) Using an Observation Path with Limited Bandwidth" IEEE Transactions on Microwave Theory and Techniques; vol. 63, No. 2; Feb. 2015, pp. 726-736.

Cavers, "Amplifier Linearization Using a Digital Predistorter with Fast Adaption and Low Memory Requirements;" IEEE Transactions on Vehicular Technology; vol. 39; No. 4; Nov. 1990, pp. 374-382.

D'Andrea et al., "Nonlinear Predistortion of OFDM Signals over Frequency-Selective Fading Channels," IEEE Transactions on Communications; vol. 49; No. 5, May 2001; pp. 837-843.

Guan, et al. "Optimized Low-Complexity Implementation of Least Squares Based Model Extraction of Digital Predistortion of RF Power Amplifiers", IEEE Transactions on Microwave Theory and Techniques; vol. 60, No. 3, Mar. 2012; pp. 594-603.

Henrie, et al., "Cancellation of Passive Intermodulation Distortion in Microwave Networks", Proceedings of the 38.sup.th European Microwave Conference, Oct. 2008, Amsterdam, The Netherlands, pp. 1153-1156.

Hong et al., "Weighted Polynomial Digital Predistortion for Low Memory Effect Doherty Power Amplifier," IEEE Transactions on Microwave Theory and Techniques; vol. 55; No. 5, May 2007, pp. 925-931.

(56) References Cited

OTHER PUBLICATIONS

Kwan, et al., "Concurrent Multi-Band Envelope Modulated Power Amplifier Linearized Using Extended Phase-Aligned DPD", IEEE Transactions on Microwave Theory and Techniques; vol. 62, No. 12, Dec. 2014, pp. 3298-3308.
Lajoinie et al. Efficient Simulation of NPR for the Optimum Design of Satellite Transponders SSPAs, EEE MIT-S International; vol. 2; Jun. 1998; pp. 741-744.
Li et al. "High-Throughput Signal Component Separator for Asymmetric Multi-Level Outphasing Power Amplifiers," IEEE Journal of Solid-State Circuits; vol. 48; No. 2; Feb. 2013; pp. 369-380.
Liang, et al. "A Quadratic-Interpolated Lut-Based Digital Predistortion Techniques for Cellular Power Amplifiers", IEEE Transactions on Circuits and Systems; II: Express Briefs, vol. 61, No. 3, Mar. 2014; pp. 133-137.
Liu, et al. "Digital Predistortion for Concurrent Dual-Band Transmitters Using 2-D Modified Memory Polynomials", IEEE Transactions on Microwave Theory and Techniques, vol. 61, No. 1, Jan. 2013, pp. 281-290.
Molina, et al. "Digital Predistortion Using Lookup Tables with Linear Interpolation and Extrapolation: Direct Least Squares Coefficient Adaptation", IEEE Transactions on Microwave Theory and Techniques, vol. 65, No. 3, Mar. 2017; pp. 980-987.
Morgan, et al. "A Generalized Memory Polynomial Model for Digital Predistortion of RF Power Amplifiers," IEEE Transactions of Signal Processing; vol. 54; No. 10; Oct. 2006; pp. 3852-3860.
Muta et al., "Adaptive predistortion linearization based on orthogonal polynomial expansion for nonlinear power amplifiers in OFDM systems", Communications and Signal Processing (ICCP), International Conference on, IEEE, pp. 512-516, 2011.
Naraharisetti, et a., "2D Cubic Spline Implementation for Concurrent Dual-Band System", IEEE, 2013, pp. 1-4.
Naraharisetti, et al. "Efficient Least-Squares 2-D-Cubic Spline for Concurrent Dual-Band Systems", IEEE Transactions on Microwave Theory and Techniques, vol. 63; No. 7, Jul. 2015; pp. 2199-2210.
Panigada, et al. "A 130 mW 100 MS/s Pipelined ADC with 69 SNDR Enabled by Digital Harmonic Distortion Correction," IEEE Journal of Solid-State Circuits; vol. 44; No. 12; Dec. 2009, pp. 3314-3328.
Peng, et al. "Digital Predistortion for Power Amplifier Based on Sparse Bayesian Learning", IEEE Transactions on Circuits and Systems, II: Express Briefs; 2015, pp. 1-5.
Quindroit et al. "FPGA Implementation of Orthogonal 2D Digital Predistortion System for Concurrent Dual-Band Power Amplifiers Based on Time-Division Multiplexing", IEEE Transactions on Microwave Theory and Techniques; vol. 61; No. 12, Dec. 2013, pp. 4591-4599.
Rawat, et al. "Adaptive Digital Predistortion of Wireless Power Amplifiers/Transmitters Using Dynamic Real-Valued Focused Time-Delay Line Neural Networks", IEEE Transactions on Microwave Theory and Techniques; vol. 58, No. 1; Jan. 2010; pp. 95-104.
Safari, et al. "Spline-Based Model for Digital Predistortion of Wide-Band Signals for High Power Amplifier Linearization", IEEE; 2007, pp. 1441-1444.
Sevic, et al. "A Novel Envelope-Termination Load-Pull Method of ACPR Optimization of RF/Microwave Power Amplifiers," IEEE MTT-S International; vol. 2, Jun. 1998; pp. 723-726.
Tai, "Efficient Watt-Level Power Amplifiers in Deeply Scaled CMOS," Ph.D. Dissertation; Carnegie Mellon University; May 2011; 129 pages.
Tehran, et al. "Modeling of Long Term Memory Effects in RF Power Amplifiers with Dynamic Parameters", IEEE; 2012, pp. 1-3.
Yu et al. "A Generalized Model Based on Canonical Piecewise Linear Functions for Digital Predistortion", Proceedings of the Asia-Pacific Microwave Conference; 2016, pp. 1-4.
Yu, et al. "Band-Limited Volterra Series-Based Digital Predistortion for Wideband RF Power Amplifiers," IEEE Transactions of Microwave Theory and Techniques; vol. 60; No. 12; Dec. 2012, pp. 4198-4208.
Yu, et al. "Digital Predistortion Using Adaptive Basis Functions", IEEE Transations on Circuits and Systems—I. Regular Papers; vol. 60, No. 12; Dec. 2013, pp. 3317-3327.
Zhang et al. "Linearity Performance of Outphasing Power Amplifier Systems," Design of Linear Outphasing Power Amplifiers; Google e-book; 2003; Retrieved on Jun. 13, 2014; Retrieved from Internet <URL:http:www.artechhouse.com/uploads/public/documents/chapters/Zhang-LarsonCH- 2.pdf; pp. 35-85.
Zhu et al. "Digital Predistortion for Envelope-Tracking Power Amplifiers Using Decomposed Piecewise Volterra Sereis," IEEE Transactions on Microwave Theory and Techniques; vol. 56; No. 10; Oct. 2008; pp. 2237-2247.
Cidronali, A., I. Magrini, R. Fagotti, and G. Manes. "A new approach for concurrent dual-band IF digital predistortion: System design and analysis." In 2008 Workshop on Integrated Nonlinear Microwave and Millimetre-Wave Circuits, pp. 127-130. IEEE, 2008.
Henrie, Justin, Andrew Christianson, and William J. Chappell. "Cancellation of passive intermodulation distortion in microwave networks." In Microwave Conference, 2008. EuMC 2008. 38th European, pp. 1153-1156. IEEE, 2008.
Riihonen et al., "Mitigation of Loopback Self-Interference in Full-Duplex Mimo Relays" IEEE Transactions on Signal Processing, 59(12), 5983-5993, Dec. 2011.
Cheng, Sheng-Lung, Wen-Rong Wu, Chun-Hsien Peng, Chen-Jui Hsu, and Paul Liang. "Digital predistortion for concurrent dual-band transmitter using a 2D LUT based method." In 2015 IEEE 16th Annual Wireless and Microwave Technology Conference (WAMICON), pp. 1-4. IEEE, 2015.
R.N. Braithwaite, "Implementing crest factor reduction (CFR) by offsetting digital predistortion (DPD) coefficients," 2012 Workshop on Integrated Nonlinear Microwave and Millimetre-wave Circuits, Dublin, 2012, pp. 1-3, doi: 10.1109/INMMIC.2012.6331928. (Year: 2012).
Liu Youjiang et al.: Concurrent Dual-Band Digital Predistortion with a Single Feedback Loop:, IEEE Transactions on Microwave Theory and Techniques, Plenum, USA, vol. 63, No. 5, May 1, 2015 (May 1, 2015), pp. 1556-1568, XP011580127, ISSN: 0018-9480, DOI: 10.1109/TMTT.2015.2417158.

* cited by examiner

MULTI-BAND LINEARIZATION SYSTEM

CROSS-REFERENCE TO RELATED APPLICATIONS

This application claims the benefit of U.S. Provisional Application No. 62/517,460, filed Jun. 9, 2017, the contents of which are incorporated by reference.

BACKGROUND

The present disclosure relates to digital predistortion of signals in multiple radio frequency bands.

Power amplifiers, especially those used to transmit radio frequency communications, generally have nonlinear characteristics. For example, as a power amplifier's output power approaches its maximum rated output, nonlinear distortion of the output occurs. One way of compensating for the nonlinear characteristics of power amplifiers is to 'pre-distort' an input signal (e.g., by adding an 'inverse distortion' to the input signal) to negate the nonlinearity of the power amplifier before providing the input signal to the power amplifier. The resulting output of the power amplifier is a linear amplification of the input signal with reduced nonlinear distortion. Digital predistorted power amplifiers are relatively inexpensive and power efficient. These properties make digital predistorted power amplifiers attractive for use in telecommunication systems where amplifiers are required to inexpensively, efficiently, and accurately reproduce the signal present at their input.

In circumstances where the input signal comprises two or more bands (e.g., $x_1$ and $x_2$), the use of even a simple non-linear model of the power amplifier (and thus of the DPD used to pre-distort, or invert, the non-linear behavior of the power amplifier) can result in a large number cross-terms in the representation of the non-linearity behavior of the transmit chain. The number of cross-terms can grow exponentially as the number of signal bands that are provided as input to the power amplifier grows.

SUMMARY

In a general aspect, a linearization system includes a digital predistorter (DPD) which applies weighed basis functions to a multi-band input to generate a predistorted multi-band input signal. The basis functions of the DPD are determined from a single-band model (e.g., polynomial model) of the nonlinearity of the transmit chain. Certain terms associated with distortion caused by processing a multi-band signal according to single-band model are omitted from the single-band model. By configuring the basis functions according to the single-band model with certain terms omitted, certain types of distortion (e.g., aliasing of high order harmonics) are avoided without having to operate the DPD at an increased bandwidth, while using a relatively small number of parameters in the model of the transmit chain nonlinearity.

Thus, in some variations, a method for digital predistortion of multiband signals is provided. The method includes receiving an input signal comprising multiple signal portions in different frequency bands, the input signal configured to be processed by a transmit chain of a power amplification system with the transmit chain comprising at least a power amplifier that produces output with non-linear distortions, with the non-linear distortions of the transmit chain being represented using a set of basis functions derived according to a single-band model of the non-linear distortions. The method further includes performing digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain.

Embodiments of the method may include at least some of the features described in the present disclosure, including one or more of the following features.

Performing the digital predistortion on the signal components derived from the multiple signal portions of the input signal using the reduced set of the basis functions may include performing the digital predistortion on the signal components using a sampling rate corresponding to a sampling bandwidth that is larger than any individual one of the different frequency bands for the multiple signal portions, but smaller than a total input bandwidth for the input signal comprising the multiple signal portions.

The excluded at least some resultant basis functions may include cross-terms basis functions for two or more of the multiple signal portions in the different frequency bands.

The excluded at least some basis functions include the cross-terms basis functions for the two or more of the multiple signal portions that may be located at frequency locations outside a pre-determined frequency reference window.

The excluded at least some basis functions include the cross-terms basis functions for the two or more of the multiple signal portions that may be located at frequency locations outside a pre-determined frequency reference window, and have relative energy levels below a pre-determined energy threshold.

The signal components may include one or more of, for example, individual separated parts of the multiple signal portions, individual normalized parts of the multiple signal portions, or cross-term combinations of one or more of the individual parts of the multiple signal portions.

The method may further include separating the multiple signal portions into the individual separated parts of the multiple signal portions.

Separating the multiple signal portions into the individual separated parts may include applying one or more bandpass filters to the input signal to produce the individual separated parts.

The method may further include computing the individual normalized parts of the multiple signal portions according to:

$$w_j = x_j \frac{1}{\left(\sum_{k=1}^{n} |x_k|^2\right)^p}$$

with $x_j$ being one of n individual parts of the multiple signal portions of the input signal, and with p including a fractional exponent selected to yield good performance for an output of the transmit chain resulting from the produced digital predistorted signal.

Performing the digital predistortion may include computing digital predistortion coefficients to weigh the reduced set of basis functions.

Computing the digital predistortion coefficients may include deriving a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components.

The method may further include applying the input values of the signal components to the respective first group of the basis function terms, weighed by the first group of digital predistortion coefficients, to produce first resultant signals, applying the normalized input values of the signal components to the respective second group of basis functions, weighed by the second group of digital predistortion coefficients, to produce second resultant signals, applying the input values of the combinations of the signal components to the respective third group of basis functions, weighed by the third group of digital predistortion coefficients, to produce third resultant signals, and combining the first resultant signals, the second resultant signals, and the third resultant signals to produce the digital predistorted signal.

Computing the digital predistortion coefficients may include periodically computing the digital predistortion coefficients used to weigh the reduced set of basis function terms.

Periodically computing the digital predistortion coefficients may include periodically computing the digital predistortion coefficients that result in a minimization of a difference between amplified values of one or more instances of the signal components, and observed output signals of the transmit chain resulting from inputting into the transmit chain a resultant signal produced by weighing the reduced set of the basis functions by the computed digital predistortion coefficients and applying to the weighed reduced set of the basis functions the one or more instances of the signal components.

In some variations, a system for digital predistortion of multiband signals is provided. The system includes a power amplification system comprising a transmit chain including at least a power amplifier that produces output with non-linear distortions, with the non-linear distortions of the transmit chain being represented using a set of basis functions derived according to a single-band model of the non-linear distortions. The system further includes a controller to perform digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain.

In some variations, a design structure encoded on a non-transitory machine-readable medium is provided. The design structure includes elements that, when processed in a computer-aided design system, generate a machine-executable representation of a multiband predistorter that includes a power amplification circuit comprising a transmit chain including at least a power amplifier that produces output with non-linear distortions, with the non-linear distortions of the transmit chain being represented using a set of basis functions derived according to a single-band model of the non-linear distortions. The representation of the multiband predistorter also includes a control circuit to perform digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain.

In some variations, a non-transitory computer readable media is provided, that is programmed with instructions, executable on a processor, to receive an input signal comprising multiple signal portions in different frequency bands, the input signal configured to be processed by a transmit chain of a power amplification system with the transmit chain comprising at least a power amplifier that produces output with non-linear distortions, with the non-linear distortions of the transmit chain being represented using a set of basis functions derived according to a single-band model of the non-linear distortions. The instructions include additional instructions to perform digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain.

In some variations, an integrated circuit definition dataset that, when processed in an integrated circuit manufacturing system, configures the integrated circuit manufacturing system to manufacture one or more of the system modules described above.

In some variations, a non-transitory computer readable media is provided that is programmed with a set of computer instructions executable on a processor that, when executed, cause the operations comprising the various method steps described above.

Embodiments of the system for digital predistortion of multiband signals, the design structure, the integrated circuit definition dataset, and the computer-readable media may include at least some of the features described in the present disclosure, including at least some of the features described above in relation to the method, and the system.

Other features and advantages of the invention are apparent from the following description, and from the claims.

BRIEF DESCRIPTION OF DRAWINGS

These and other aspects will now be described in detail with reference to the following drawings.

Like reference symbols in the various drawings indicate like elements.

DETAILED DESCRIPTION

Described herein are systems, devices, methods, media, and other implementations that include a method for digital predistortion of multiband signals, with the method including receiving an input signal comprising multiple signal portions in different frequency bands, the input signal configured to be processed by a transmit chain of a power amplification system with the transmit chain comprising at least a power amplifier that produces output with non-linear distortions, with the non-linear distortions of the transmit chain are represented using a set of basis functions derived according to a single-band model of the non-linear distortions. The method further includes performing digital pre-distortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain. For example, in some embodiments, the excluded at least some basis functions comprise cross-terms basis functions for two or more of the multiple signal portions in the different frequency bands, e.g., excluding basis functions corresponding to cross-terms for the two or more of the multiple signal portions that are located at frequency locations outside a pre-determined frequency reference window and/or whose energy contribution (as determined based on a pre-determined derivation of expansion terms for the particular model selected to represent the non-linear distortion of the transmit chain) is below some pre-determined threshold.

Figure 1:
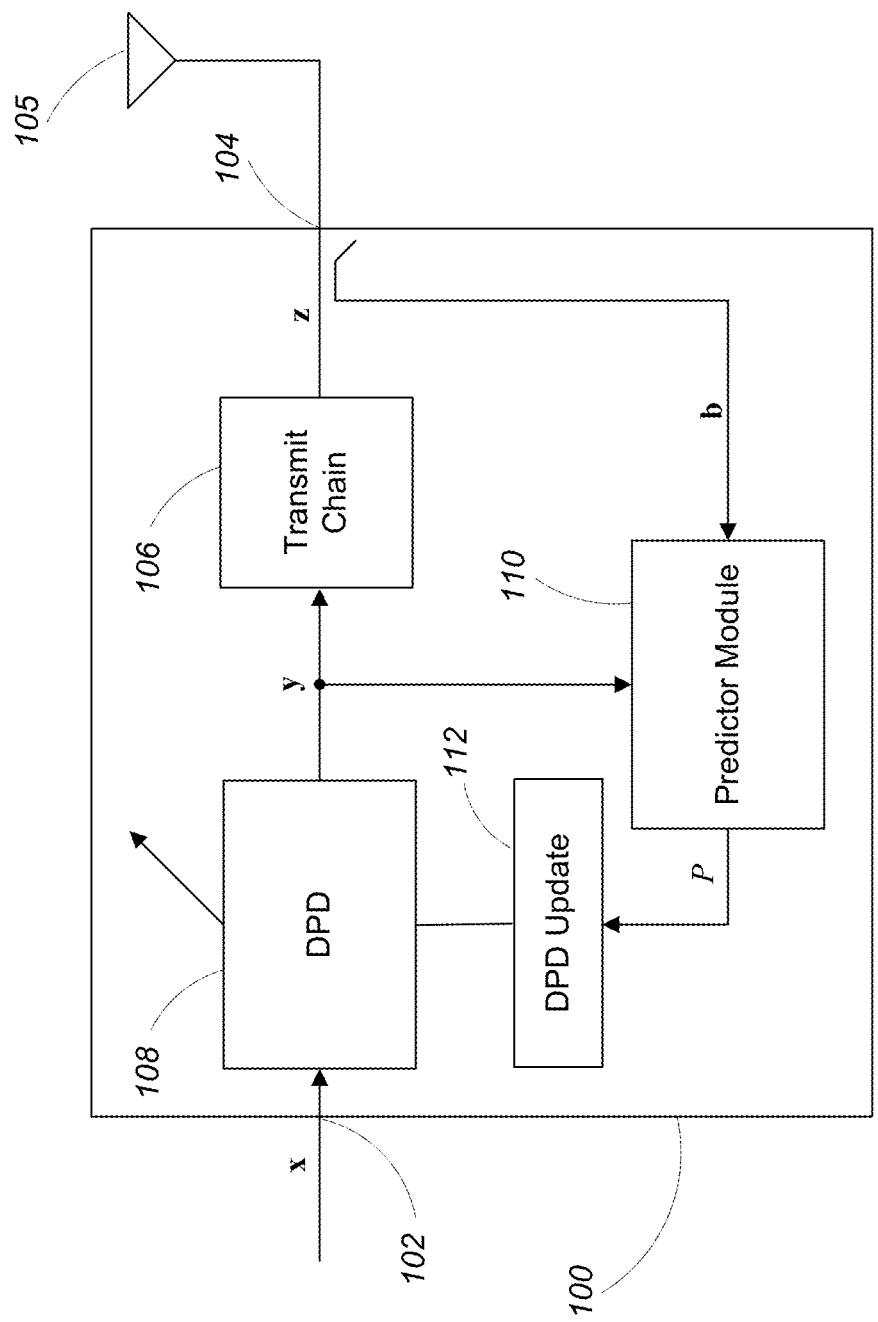
FIG. 1 is a schematic diagram of a linearization system implementation.

Thus, with reference to FIG. 1, comprising a schematic diagram of a linearization system implementation 100, in one embodiment, the linearization system 100 includes an input 102 for receiving an input signal, x, and an output 104 for providing an output signal, z to an antenna 105. The system 100 includes a transmit chain 106, a digital predistorter (DPD) 108, a DPD update module 112, and a predictor module 110. In general, the transmit chain 106 includes a power amplifier and possibly other nonlinear components and therefore has a nonlinear input/output power characteristic.

When an intermediate input signal, y is provided to the transmit chain 106, the transmit chain 106 generates the output signal, z as an amplified version of the intermediate input signal, y, in radio frequency. In general, the output signal, z includes nonlinear distortion due to the nonlinear input/output power characteristic of the transmit chain 106.

Without compensation, the output signal, z would not be an accurate amplified reproduction of the input signal, x. The system 100 includes the DPD 108, which applies adaptable basis functions to the input signal, to compensate for the nonlinear distortion introduced by the transmit chain 106. In particular, the DPD 108 receives the input signal, x and "predistorts" the signal to generate the intermediate input signal, y. Ideally, the intermediate input signal, y includes an "inverse nonlinear distortion" (i.e., an inverse of the nonlinear distortion introduced by the transmit chain 106), such that the nonlinear distortion introduced by the transmit chain 106 is substantially cancelled by the inverse nonlinear distortion. The output signal, z is therefore substantially free of nonlinear distortion.

Examples of techniques and approaches for deriving and/or updating the DPD parameters/coefficients used to adaptively control the behavior of the linearization applied to the signal processed by the system 100 can be found, for example, in U.S. Provisional Patent Application No. 62/517,380, entitled "LINEARIZATION SYSTEM," and in U.S. Provisional Application No. 62/517,434, entitled "Sub-sampled Linearization System" and filed Jun. 9, 2017, the contents of all of which are incorporated herein by reference in their entireties. For example, to update the parameters, a, used by the DPD 108 of FIG. 1, the predictor module 110 processes the intermediate input signal to the transmit chain 106 (i.e., the signal y), and a sensed version (e.g., a signal b) of the output signal z of the transmit chain (or some other output module that is downstream of the transmit chain) to generate an updated set of parameters, a'. In one example, the predictor module 110 determines an updated set of parameters a' that, in combination with the basis functions and the intermediate input signal, y, generate a predicted signal that is as close as possible to the sensed signal, b (e.g., in a least mean squared error sense). This can be restated as:

$$P(y) = \sum_{i=1}^{n} \alpha_i f_i(y)$$

The predictor, P, may be provided to a DPD update module (which may be part of the predictor module 110) which processes the predictor P to update the DPD 108. In some examples, for the predictor P described above, the DPD update module configures the DPD 108 to perform according to an approximate inverse of the predictor P as follows:

$$DPD(x) = P^{-1}(x) \approx 2x - \sum_{i=1}^{n} \alpha_i f_i(x)$$

or by explicitly setting the DPD parameters as: $a_i = -\alpha_i$.

In another example, the predictor module 110 may be configured to determine an updated set of parameters $\hat{\alpha}$ that, in combination with the basis functions and the sensed signal, b, generate a predicted signal, $\hat{y}$ that is as close as possible to the intermediate input signal, y (e.g., in a least mean squared error sense). This can be restated as:

$$P(b) = \sum_{i=1}^{n} \alpha_i f_i(b).$$

That is, in such embodiments, P is an estimate of a (post) inverse of the nonlinearity of the transmit chain 106. The predictor P is provided to the DPD update 112 which processes the predictor, P to update the DPD 108. In some examples, for the predictor P described immediately above, the DPD update module configures the DPD 108 to perform according to the predictor P as follows:

$$DPD(x) = P(b) = \sum_{i=1}^{n} \alpha_i f_i(b)$$

or essentially $a_i = \alpha_i$.

Instead of deriving updated parameters, α', that cause the sense value, b, to be as close as possible to the intermediate signal y, in another example, updating of the DPD parameters may be implemented to generate an updated set of parameters, a', that, in combination with the basis functions, represent a difference between the model of the nonlinear input/output characteristic of the transmit chain 106 currently being used by the DPD 108 and the current nonlinear input/output characteristic of the transmit chain 106. In one example, the predictor module determines parameters α that, in combination with the basis functions and the input signal, x, to the DPD (rather than using the intermediate signal y) generate a predicted signal, b̂ that is as close as possible to the sensed signal, b (e.g., in a least mean squared error sense), which can be restated as:

$$P(x) = \sum_{i=1}^{n} \alpha_i f_i(x).$$

The parameters, α in combination with the basis functions represent the difference between the model of the nonlinear input/output characteristic of the transmit chain (e.g., the transmit chain 106) currently being used by the DPD (e.g., DPD 108) and the current nonlinear input/output characteristic of the transmit chain because the effects both the DPD and the transmit chain on the input signal, x, are represented in the sensed signal, b. An output of the predictor module, i.e., P, is provided to a DPD update module which processes the predictor P to update the DPD 108. In some examples, for the predictor P the DPD update module configures the DPD to combine an approximate inverse of the predictor with the existing DPD according to $a'_i \leftarrow a_i + \alpha_i$. This essentially approximates a cascade of the approximate inverse of the predictor, $P^{-1}$, with the previous DPD configuration to yield the new DPD configuration.

Another example approach to implement determination of DPD parameters is described in U.S. Pat. No. 9,590,668, entitled "Digital Compensator," the content of which is hereby incorporated by reference in its entirety. Briefly, with reference to FIG. 6, a block diagram of an adjustable pre-distorting power amplifier system 600, which may be similar to, or include, the portion of the system 100 comprising the DPD 108, the transmit chain 106, and the predictor module 110 of the system 100 of FIG. 1, is shown. In the example system 600, a digital input signal x[m] at a baseband or intermediate frequency is passed through a Digital Pre-Distorter (DPD) 610 (which may be similar, in implementation or functionality, to the DPD 108) to produce a "pre-distorted" input y[m], which is passed through a transmit chain 640 to produce a driving signal v(t) that drives an antenna 650. The transmit chain may include a Digital-to-Analog Converter (DAC) 642, an analog lowpass filter (LPF) 644, and a modulator 646 (e.g., multiplication by a local oscillator) of the output of the LPF 644. The output of the modulator is passed to a power amplifier (PA) 648. The PA 648, as well as other elements in the transmit chain, may introduce non-linearities, which may be manifested in the driving signal v(t) as harmonic and/or intermodulation distortion of the input signal x[m]. As noted, to overcome or mitigate these non-linearities, the DPD 610 introduces non-linearities that are intended to "pre-invert" (i.e. pre-distort) the non-linear effects of the transmit chain. In some examples, the DPD performs the transformation of the desired signal x[m] to the input y[m] of the transmit chain by using delay elements (not shown) to form a set of delayed versions of the desired signal, and then using a non-linear polynomial function of those delayed inputs. In some examples, the non-linear function is a Volterra series:

$$y[n] = h_0 + \sum_{p} \sum_{\tau_1,\ldots,\tau_p} h_p(\tau_1, \ldots \tau_p) \prod_{j=1\ldots p} x[n-\tau_j] \prod \overline{x[n-\tau_j]} \sum_{k=1}^{K} \sum_{m_1=0}^{M} \ldots$$

$$\sum_{m_k=0}^{M} h_k(m_1,\ldots,m_{2k-1}) \prod_{j=1}^{k} x(n-m_j) \prod_{j=k+1}^{2k-1} \overline{x(n-m_j)}$$

In some examples, the non-linear function is a reduced set of Volterra terms, for example a delay polynomial:

$$y[n] = h_0 + \sum_p \sum_\tau h_p(\tau) x[n-\tau] |x[n-\tau]|^{(p-1)}$$

To invert the non-linear effects of the transmit chain, a relatively large number of terms of such a series representation may be needed, and the coefficients of those terms (e.g., $h_p$ terms) need to be accurately set. The coefficients in such approaches may be continually updated to maintain good linearization. Approaches to such continual updating may include, for example, incremental updates using y[m] (the output of DPD 610), and/or observation of v(t) and other system characteristics.

Figure 6:
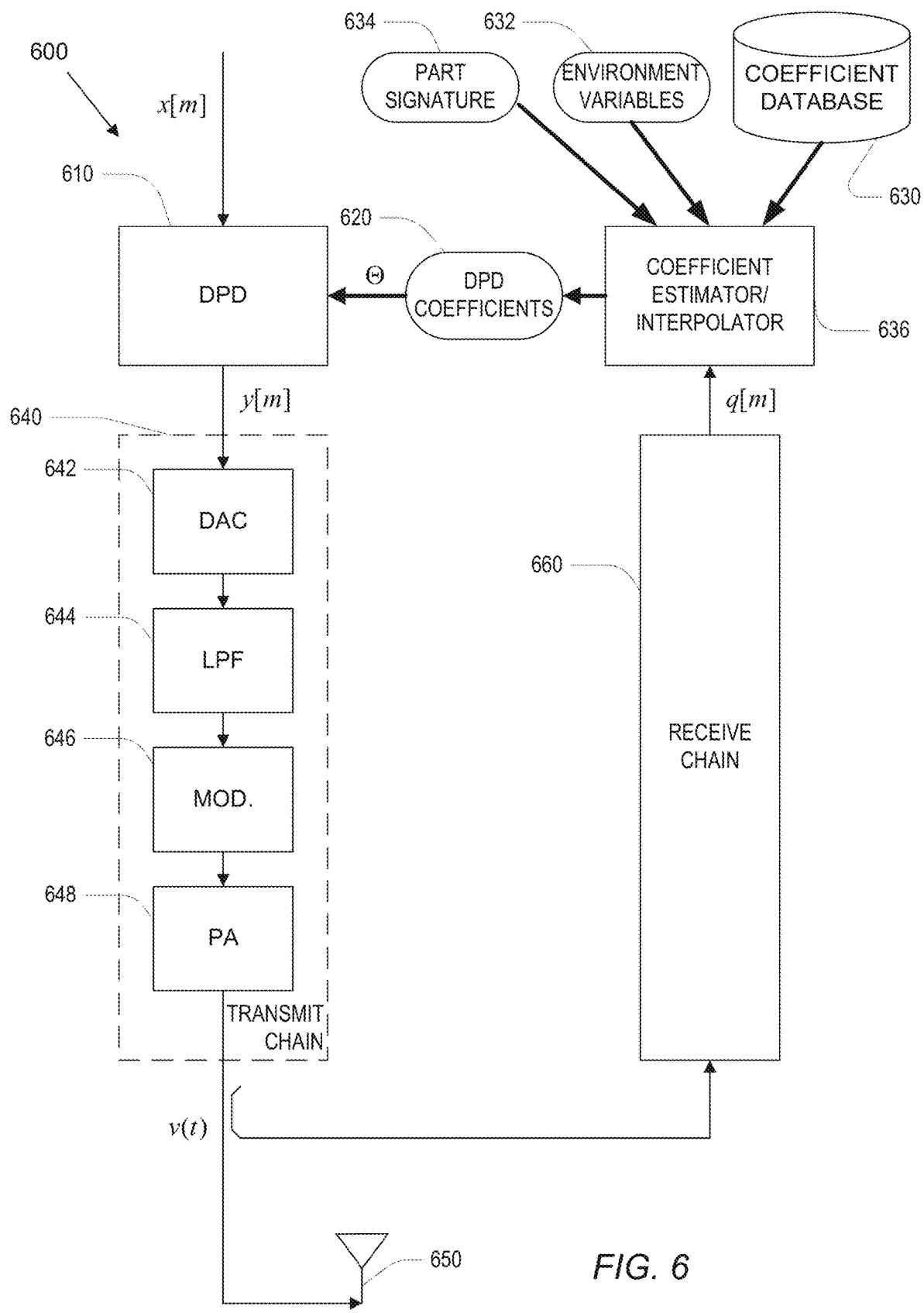
FIG. 6 is a block diagram of an adjustable pre-distorting power amplifier system that may be used as part of the implementations of the systems of FIGS. 1 and 3.

With continued reference to FIG. 6, the DPD 610 may be controlled using a controller to determine/compute DPD coefficients (shown as DPD coefficients Θ 620) to adjust the DPD 610 using such determined DPD coefficients. In some embodiments, the DPD coefficients Θ 620 are determined using a database of coefficients 630, and values that essentially characterize the operation "regime" (i.e., a class of physical conditions) of the transmit chain, and/or of other system components (including remote load components and load conditions). These values (e.g., quantitative or categorical digital variables) include environment variables 632 (e.g., temperature, transmitter power level, supply voltage, frequency band, load characteristics, etc.) and/or a part "signature" 634, which represents substantially invariant characteristics, and which may be unique to the electronic parts of the transmit chain 640.

Determined system characteristic values or attributes may be provided to a coefficient estimator/interpolator 636 (e.g., via a feedback receive chain 660). The determined characteristics and metrics may be used to estimate/derive appropriate DPD coefficients. For example, the DPD coefficient sets may be computed so as to achieve some desired associated distortion measures/metrics that characterize the effects of the preprocessing, including an error vector magnitude (EVM), an adjacent channel power ratio (ACPR), operating band unwanted emissions (OBUE) or other types of distortion measures/metrics.

The coefficient interpolator 636 uses the various inputs it receives to access the coefficient database 632 and determine and output the corresponding DPD coefficients 620. A variety of approaches may be implemented by the coefficient estimator/interpolator 636, including selection and/or interpolation of coefficient values in the database according to the inputs, and/or applying a mathematical mapping of the input represented by values in the coefficient database. For example, the estimator/interpolator 636 may be configured to select, from a plurality of sets of DPD coefficients (in the database 630), a DPD coefficient set associated with one or more pre-determined system characteristics or some metric derived therefrom. The DPD coefficients used to control/adjust the DPD 610 may be determined by selecting two or more sets of DPD coefficients from a plurality of sets of DPD coefficients (maintained in the database 630) based on the system characteristics. An interpolated set of DPD coefficients may then be determined from the selected two or more sets of DPD coefficients.

The above example approaches to derive parameters that are applied (weighed) to the basis functions operating on the input signal x is described in relation to a particular signal, $x_1$, in a particular band (Band 1) included within a frequency window (of a bandwidth larger than that of Band 1). The basis functions for which these coefficients/parameters are derived are based on the particular model used to represent to the non-linearity. In some examples, simple low order model (which may include memory components, i.e., to obtain delayed samples, or may be based on memoryless representation) may be used, depending on the desired complexity and precision for the linearization implementation. As will be discussed in greater detail below, in situations where multiple signals in multiple bands constitute the input signal x, separate basis function groups need to be defined, and their coefficient values derived, for the different signals. In some embodiments, basis function groups may be defined for scaled values of the input signals (in the different bands) in order to perform linearization operations on such scaled values (e.g., to more accurately cancel the non-linearization effects of processing the multi-band signals through the transmit chain).

Thus, in embodiments in which the input signal comprises multiple signal portions in different frequency bands, those signal portions are used to derive multiple signal components for which separate groups of basis functions are applied. Such multiple signal components may include individual separated parts of the multiple signal portions (e.g., $x_1, x_2, \ldots, x_n$, with each of the individual separated parts corresponding to a different frequency band) that each is associated with a respective basis function group, individual normalized parts of the multiple signal portions (e.g., the samples denoted $w_1, w_2, \ldots, w_n$ in FIG. 3) that are each associated with their own respective basis function groups, and/or cross-term combinations of one or more of the individual parts of the multiple signal portions, with those cross-terms likewise associated with their own respective basis function groups. As noted, the cross-term components derived from the multiple signal portions generally exclude at least some cross-terms components (e.g., cross-term components that are outside a certain pre-determined bandwidth, and/or whose energy contribution is below some pre-defined threshold level), thus simplifying the linearization process required to cancel the non-linear effects for the multi-band input signal.

As noted, in some examples, the DPD 108 is configured according to conventional single-band model of the nonlinear characteristic of the transmit chain 106. In some examples, the single-band model of the nonlinear characteristic may be expressed as a generalized memory polynomial:

$$y_{GMP}(n) = \sum_{k=0}^{K-1} \sum_{m=0}^{M-1x} a_{km} x(n-m)|x(n-m)|^2 +$$
$$\sum_{k=1}^{Kb} \sum_{m=0}^{Mb-1} \sum_{p=1}^{Pb} b_{kmp} x(n-m)|x(n-m+p)|^2 +$$
$$\sum_{k=1}^{Kc} \sum_{m=0}^{Mc-1} \sum_{p=1}^{Pc} C_{kmp} x(n-m)|x(n-m-p)|^2$$

This polynomial can be represented as:

$$y(n) = \sum_{i=1}^{n} \alpha_i f_i(x(n))$$

As the degree of the generalized memory polynomial increases, the number of parameters that needs to be maintained increases, resulting in an undesirable increase in DPD complexity. As a result, DPD designers often use lower order polynomials and omit the memory terms of the generalized memory polynomial. One example of a conventional model used by the DPD 108 is the following $3^{rd}$ order model:

$$y_{sb}(n) = a_{00} \cdot x(n) + a_{20} \cdot x(n) \cdot |x(n)|^2$$

Advantageously, this model does not include a high number of parameters, at least when the input signal corresponding to substantially a single band. Other models may be determined to represent the non-linear behavior of a transmit chain, and those models may be used to derive digital predistortion (linearization) functions to be applied to the input signal(s) provided to the transmit chain. Such models may be customized for simplicity, to best match the particular characteristics of transmit chain, and/or to optimally process the expected bands of signals that may be provided to the power amplification system (such modeling may be determined based on experimentation and evaluation conducted on the transmit chain to assess the behavior of the transmit chain in the presence of different signal and channel characteristics).

Figure 2:
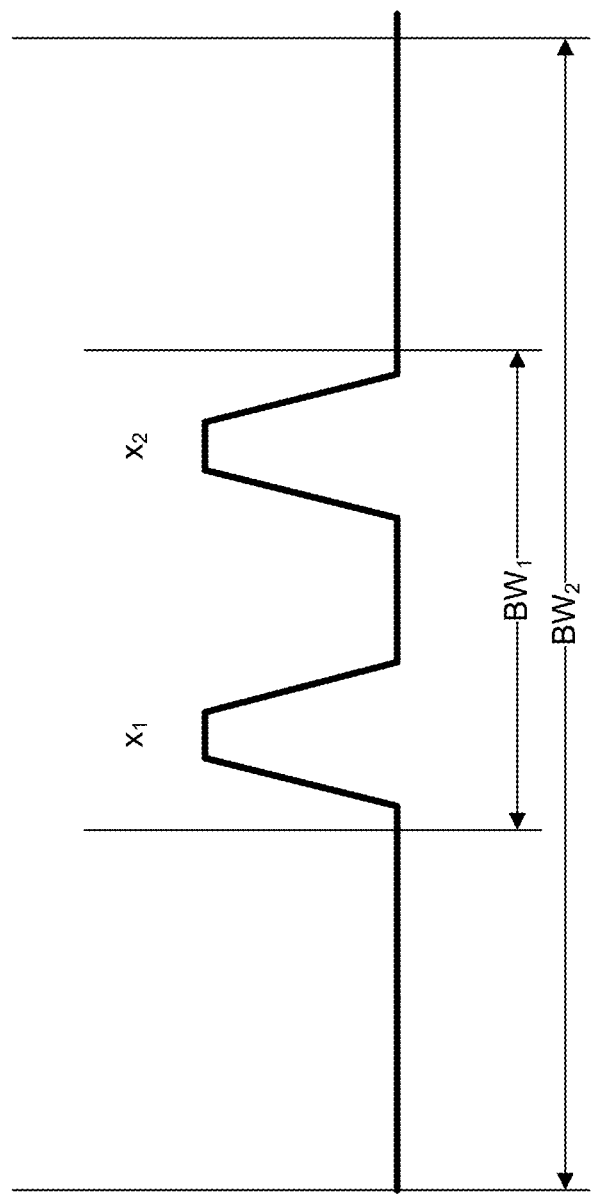
FIG. 2 is a spectral representation of a multi-band signal.
Figure 7A:
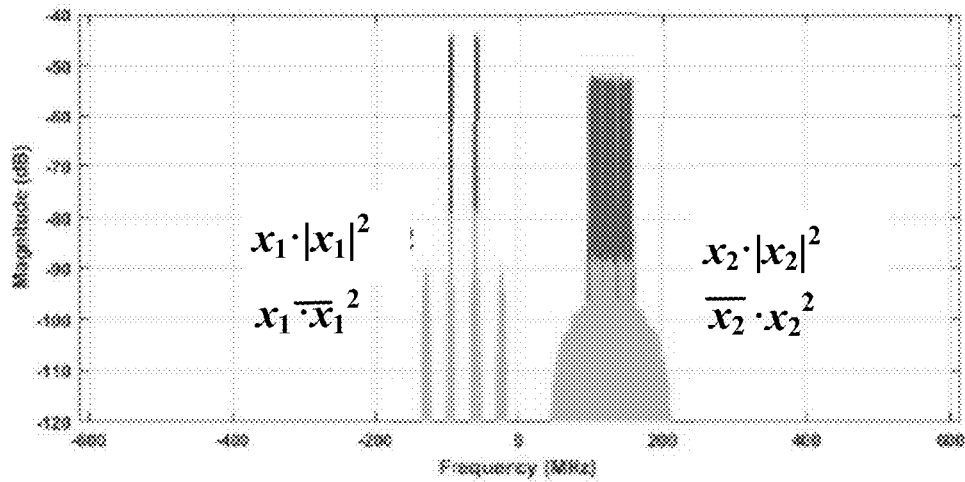
FIGS. 7A-C are graphs illustrating different types of dual-band distortions.
Figure 7B:
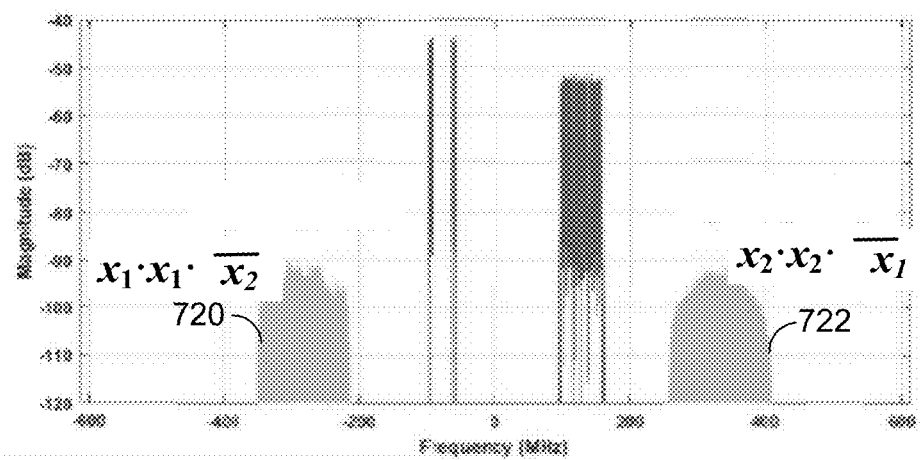
Figure 7C:
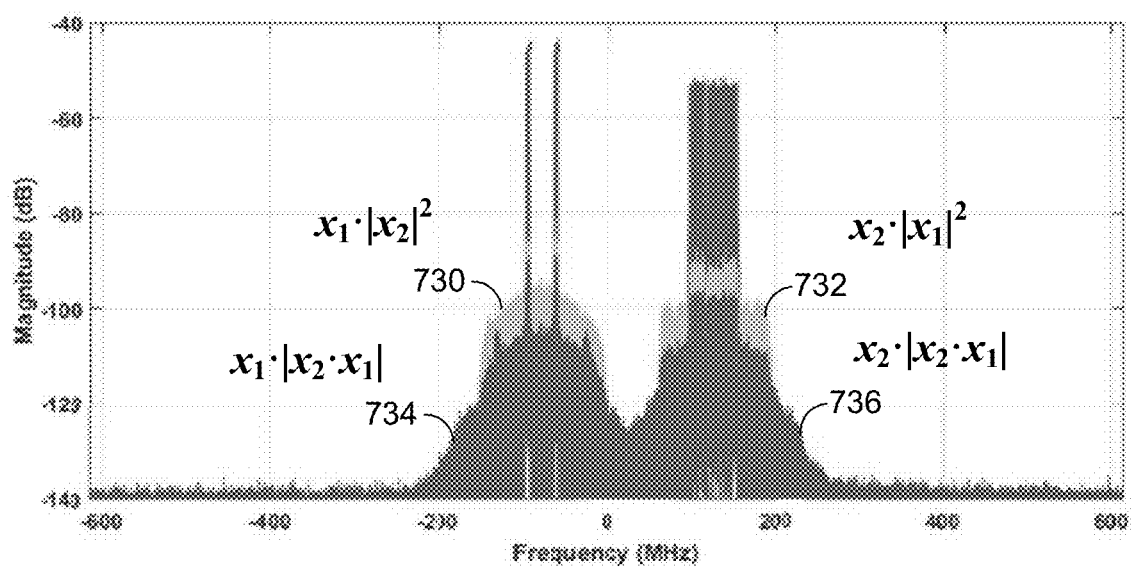

Referring to FIG. 2, a spectral representation of the input signal, x includes two or more bands of interest, $x_1$ and $x_2$. For example, if x can be represented as $x=x_1+x_2$, where $x_1$ and $x_2$ are essentially bandpass filtered components of x, the signal x can be decomposed with the intervening frequency ranges not in the respective communication bands omitted. The conventional $3^{rd}$ order single-band model above can also be used to configure the DPD 108 of FIG. 1 when there are multiple bands of interest in the input signal. However, when processing the presence of two bands of interest in the input signal using a conventional DPD 108 results in additional types of distortion being included in the output of system. For example, in-band distortion (which, in a dual-band situation, may correspond to such terms as, for example, $x_1 \cdot |x_1|^2$, $x_2 \cdot |x_2|^2$, $\overline{x_1} \cdot x_1^2$, or $\overline{x_2} \cdot x_2^2$, illustrated in FIG. 7A), out-of-band distortion (which, in the dual-band situation, may correspond to such terms as $x_1 \cdot x_1 \cdot \overline{x_2}$ or $x_2 \cdot x_2 \cdot \overline{x_1}$, illustrated in FIG. 7B as signals 720 and 722), and cross-band distortion (which, in the dual-band situation, may correspond to such terms as $x_1 \cdot |x_2|^2$, $x_2 \cdot |x_1|^2$, $x_1 \cdot |x_2 \cdot x_1|$, and $x_2 \cdot |x_2 \cdot x_1|$, which are shown in FIG. 7C as signals 730, 732, 734, and 736, respectively), may all be included in the output of the system.

At least some of these types of distortion show up in the output of the system due to aliasing effects when the input signal has a first bandwidth, $BW_1$. Some conventional DPD designers mitigate at least some of this distortion by upsampling the input data to a much higher bandwidth, $BW_2$ which can mitigate (e.g., prevent) the aliasing of the distortion back into the first bandwidth, $BW_1$. In some examples, $BW_2$ is three (3) to five (5) times larger than $BW_1$.

As noted, aspects described herein obviate the need to upsample the input signal by removing certain terms resulting from the single band model prior to configuring the DPD 108 according to the model (in such aspects the sampling rate used corresponds to a sampling bandwidth that is larger than any individual one of the different frequency bands for the multiple signal portions, but smaller than the total input bandwidth for the input signal comprising the multiple signal portions). For example, certain terms that are known a priori to cause an aliased signal to appear in $BW_1$ are removed from the selected model prior to configuring the DPD 108. It should be recognized that in decomposing a signal $x=x_1+x_2$, the output of the DPD can be represented, in some embodiments, as the function:

$$y = \sum_{i=1}^{n} \alpha_i f_i(x_1 + x_2)$$

Take, for example, $f_i(x)=x(n)|x(n)|^2$. With the decomposed signal, the function becomes:

$$f(x_1+x_2)=x_1|x_1|^2+ \ldots +2x_1^2 x_2+ \ldots$$

In another example, providing the combination of $x_1$ and $x_2$ as input to the DPD 108 results in the following expansion of a single-band model:

$y_{db}(n)=a_{00} \cdot [x_1+x_2]+a_{20} \cdot [\overline{x_1} \cdot x_1^2 + \ldots$ $2 \cdot |x_1|^2 \cdot x_2 + \ldots$ $\overline{x_1} \cdot x_2^2 + \ldots$ $\overline{x_2} \cdot x_1^2 + \ldots$ $2 \cdot |x_2|^2 \cdot x_1 + \ldots$ $\overline{x_2} \cdot x_2^2 ]$ Some of the terms (e.g., $\overline{x_1} \cdot x_2^2$ and $\overline{x_2} \cdot x_1^2$) in the above expansion are known, a-priori, to cause certain types of distortion in the output of the system and can simply be removed from the single-band model. It is noted that, in order to remove the terms, the system must have access to both $x_1$ and $X_2$ (and to additional signal portions, corresponding to additional bands, if the signal includes such additional portions) separately. As noted, the exclusion of certain cross terms may be based on the expected spectral distribution of signals within the spectral window (i.e., the bandwidth) operative for the linearization system, the transmit chain characteristic (which would affect the particular non-linearization model to be used in order to compute the basis function groups that will be used to perform the linearization of the input signals), the spectral bandwidth threshold outside of which cross-terms resulting from expansion of the selected model may be excluded, and/or the energy contribution threshold under which basis functions corresponding to cross-terms may be excluded. At least some of these factors and/or criteria governing the selection of models and thresholds may be selected a priori based, for example, on simplicity and/or expected performance (e.g., resultant accuracy of the resulting linearization behavior). The exclusion of various cross-terms allows the digital predistortion of the linearization systems described herein to be performed using a sampling rate corresponding to a sampling bandwidth that is larger than any individual one of the different frequency bands for the multiple signal portions, but smaller than the total input bandwidth for the input signal comprising the multiple signal portions. For example, if the total bandwidth for the input signal is $BW_{input}$, and each of the n individual bands of the signal components has a bandwidth $BW_i (i=1 \ldots n)$ with any $BW_i < BW_{input}$, the sampling rate required to realize the digital predistorion implementations described herein would correspond to a sampling bandwidth for which $BW_i < BW_{sampling} < BW_{input}$.

According to some of the approaches described herein, certain basis functions corresponding to various signal components (e.g., cross-terms) chosen explicitly, so that the DPD has the form:

$$y(n) = \sum_{i=1}^{n} a_i^{(1)} f_i^{(1)}(x_1) + \sum_{i=1}^{n} a_i^{(2)} f_i^{(2)}(x_2) + \sum_{i=1}^{n} a_i^{(1,2)} f_i^{(1,2)}(x_1, x_2)$$

where the basis functions $f_i^{(1,2)}(x_1, x_2)$ explicitly exclude cross-terms that, for example, are expected to exhibit substantial energy outside some pre-determined bandwidth, $BW_1$. For example, a basis function $f_i^{(1,2)}(x_1, x_2)$ of the form $\overline{x}_1 x_2^2$ may be excluded.

In operation, the parameters of the DPD may be updated using a prediction $P:b \rightarrow y$ or $P:b \rightarrow x$, that has the same form (i.e., uses the same decomposed basis functions). More generally, with n bands, a set of cross-band basis functions $f_i(x_1, x_2, \ldots, x_n)$ are used.

Figure 3:
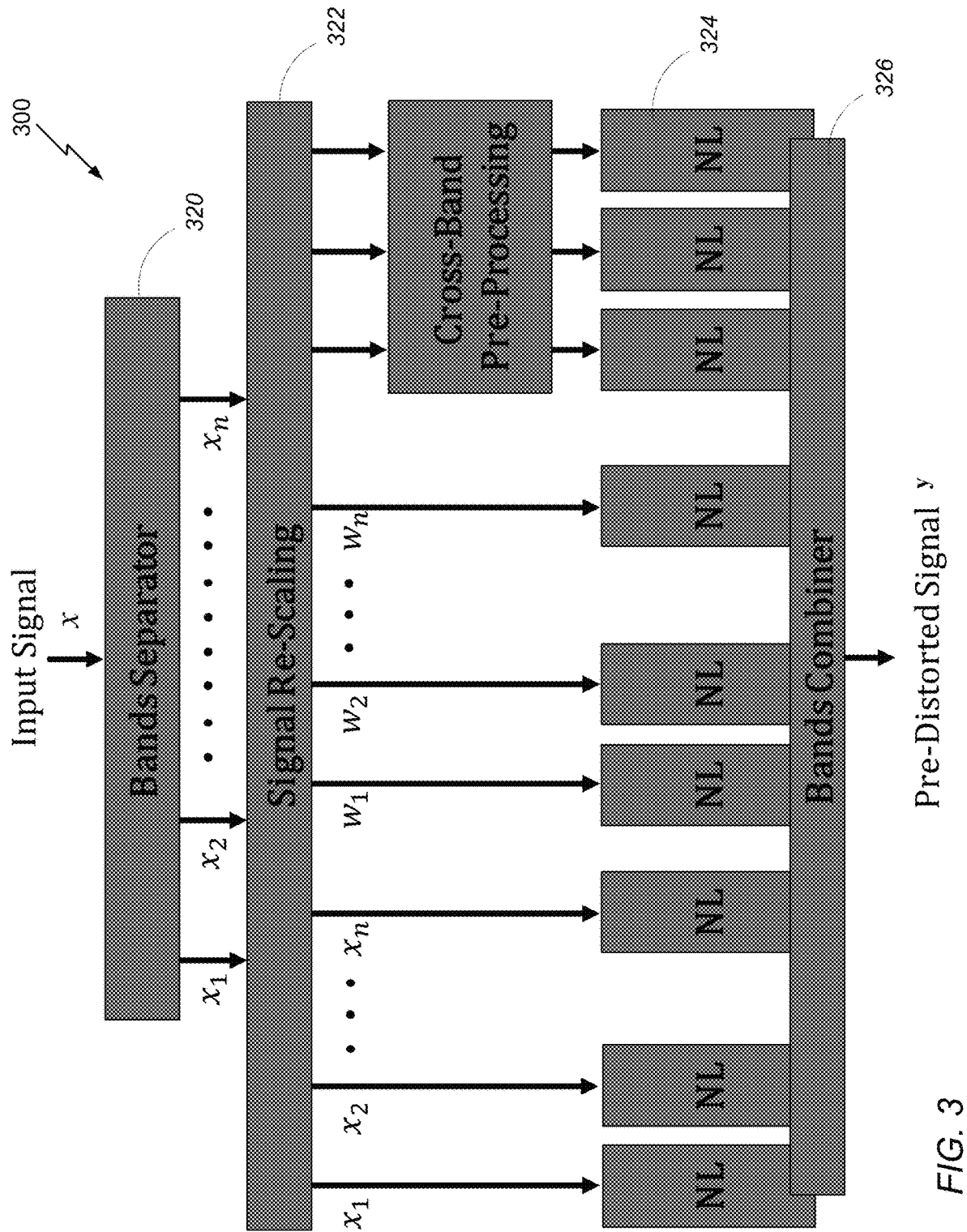
FIG. 3 is a block diagram of an example multi-band digital predistorter.

More particularly, with reference to FIG. 3, providing a block diagram of an example multi-band predistorter (linearization system) 300 implementation, in one example, the predistorter 300 (which may be implemented similarly to the DPD 108 depicted in FIG. 1) receives an input signal, x which may comprise multiple bands of interest and separates the multiple bands of interest into separate signals (e.g., using band-pass filtering) in a band separator 320. As noted, in some embodiments, in addition to the use of the basis functions $f_i^{(1)}(x_j)$ corresponding to the individual signal portions (for different bands), basis functions corresponding to normalized inputs, namely, $f_i^{(1)}(w_j)$, are used where $$w_j = x_j \frac{1}{\left(\sum_{k=1}^{n} |x_k|^2\right)^p}$$

and where p may be 0.5, 0.21, or some other fractional exponent value selected to yield good performance of the DPD. The DPD processing applied to the various signal components (e.g., the individual separate signal portions, the normalized inputs, and/or the non-excluded cross-terms) is configured (e.g., through periodic updating of DPD coefficients that are used to weigh the respective basis functions applied to the signal components so that the output at the transmit chain would be an amplified, but substantially undistorted, copy of the input signal x (which would include an amplified, but substantially undistorted, copies of the individual constituents $x_1, x_2, \ldots, x_n$)

Thus, as depicted in FIG. 3, the multiple signal portions constituting the input signal x (e.g., $x_1, x_2, \ldots, x_n$) may be separated and/or used to obtain, e.g., using a signal re-scaling module 322 (which may include the bandpass filters implemented by the band separator 320) multiple signal components (e.g., to obtain j signal components, where j>n) to which respective basis functions groups 324a-j (the blocks marked as NL) are applied. The signal components may include one or more of, for example, individual separated parts of the multiple signal portions, individual normalized parts of the multiple signal portions, and/or cross-term combinations of one or more of the individual parts of the multiple signal portions. The basis functions, with which predistortion operations are performed, exclude at least some basis functions corresponding to cross-terms that otherwise would result from using the particular non-linearization model corresponding to the transmit chain. For example, the excluded at least some basis functions may correspond to basis functions for cross-terms for the two or more of the multiple signal portions that are located at frequency locations outside a pre-determined frequency reference window. Alternatively, the excluded basis functions may correspond to cross-terms for the two or more of the multiple signal portions that are located at frequency locations outside a pre-determined frequency reference window, and/or have relative energy levels below a pre-determined energy threshold.

Thus, in some embodiments, the modelling to represent the transmit chain's non-linear behavior may be determined at some earlier point of time, and the basis function groups for that pre-determined model, using a pre-determined number of possible signal bands, can be derived (using mathematical expansion of the model's terms for the pre-determined number of signal bands). The number of signal bands that are used in the expansion may correspond to the maximum allowed number of separate bands that can be supported by the transmit chain. For example, if the transmit chain can support twenty (20) bands, then for the model determined to represent the transmit chain's non-linearity, an expansion of the model's representation for 20 such signals is performed. This may result in a very large number of terms, but the actual number of terms can be reduced by excluding at least some of the cross-terms resulting from the expansion according to pre-defined criteria, rules, and/or an exclusion algorithm(s). The remaining terms are represented using the basis functions selected to represent the linearization operations to be performed on the signal components derived (e.g., through the re-scaling operation of the re-scaling module 322). During operation, the DPD coefficients used to weigh the basis function groups can be periodically dynamically adjusted in order to substantially achieve cancellation of the non-linear effects of the transmit chain. In situations where the actual number of bands is lower than the number of bands for which the basis function groups of the predistorter 300 were computed, the basis function groups that correspond to non-present bands will become inactive (because they will be operating on bands containing no energy). It is to be noted that in some embodiments, the bands of the input signals may correspond to base band signals, while in some embodiments, the bands may correspond to frequency shifted signals (shifted using a modulator/frequency multiplier, implemented with an oscillator).

In embodiments in which multiple signal components are obtained from the multiple signal portions constituting the input signal $x_n$, the predistorter 300, configured to compute the digital predistortion coefficients, is configured to derive a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components. The predistorter 300 is further configured to apply the input values of the signal components to the respective first group of the basis function terms, weighed by the first group of digital predistortion coefficients, to produce first resultant signals, apply the normalized input values of the signal components to the respective second group of basis functions, weighed by the second group of digital predistortion coefficients, to produce second resultant signals, apply the input values of the combinations of the signal components to the respective third group of basis functions, weighed by the third group of digital predistortion coefficients, to produce third resultant signals, and combine (e.g., using a bands combiner 326 which may be implemented as a signal summation module) the first resultant signals, the second resultant signals, and the third resultant signals to produce the digital predistorted signal.

The separate signal components (at the output of the signal re-scaling module 322) are processed according to a number of basis function groups 324$a$-$j$ which are weighed by adjustable weighting parameters associated with the predistorter 300. The weighed parameters may be derived in a manner similar to that discussed with respect to FIG. 1. Thus, in such embodiments, the multi-band predistorter 300 may be configured to periodically compute the digital predistortion coefficients used to weigh the reduced set of basis function terms (represented using the basis function groups 324$a$-$j$). In some examples, the predistorter 300 (which may be implemented using a local or remote circuitry that may include one or more processor-based devices) is configured to periodically compute the digital predistortion coefficients that result in a minimization of a difference between amplified values of one or more instances of the signal components, and observed output signals of the transmit chain resulting from inputting into the transmit chain a resultant signal produced by weighing the reduced set of the basis functions by the computed digital predistortion coefficients and applying to the weighed reduced set of the basis functions the one or more instances of the signal components. This computation may be performed separately for the various signal components derived from the multiple signal portions of the input signal x.

As noted, at least some of the basis functions 324 are configured according to the single-band model of the non-linear distortion of the transmit chain with certain problematic terms of the model omitted. The output of the basis functions 324, weighted by the weighting parameters are synthesized into a pre-distorted output signal, y by the bands combiner 326. By omitting the problematic terms from the single-band model used to configure the basis functions 324, certain types of distortion (e.g., aliasing of high order harmonics into $BW_1$) are avoided without having to operate the DPD at the high bandwidth, $BW_2$ while using a relatively small number of parameters in the model of the transmit chain nonlinearity.

Figure 4:
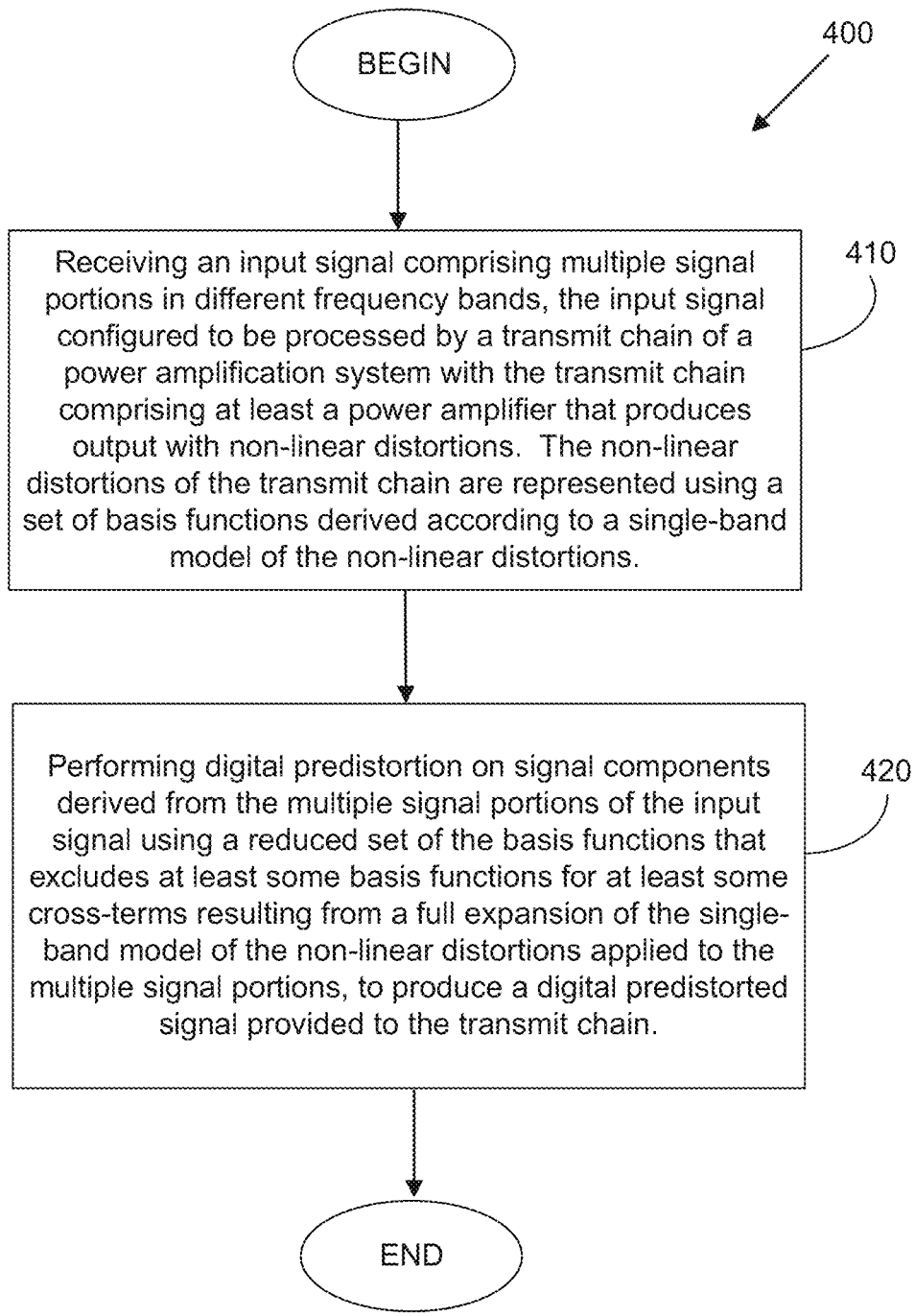
FIG. 4 is a flowchart of an example multi-band linearization (predistortion) procedure.

With reference to FIG. 4, a flowchart of an example procedure 400 for digital predistortion of multiband signals is shown. The procedure 400 includes receiving 410 an input signal comprising multiple signal portions (e.g., the signals $x_1$, $x_2$, . . . , $x_n$ depicted in FIG. 3) in different frequency bands, with the input signal configured to be processed by a transmit chain of a power amplification system (the transmit chain 106 of the power amplification system 100 of FIG. 1) with the transmit chain comprising at least a power amplifier that produces output with non-linear distortions. The non-linear distortions of the transmit chain are represented using a set of basis functions derived according to a single-band model of the non-linear distortions.

The procedure 400 further includes performing 420 digital predistortion on signal components (e.g., the components $x_1$, $x_2$, . . . , $x_n$, $w_1$, $w_2$, $w_n$, and the cross-terms depicted in FIG. 3) derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain. In some implementations, performing the digital predistortion on the signal components derived from the multiple signal portions of the input signal using the reduced set of the basis functions may include performing the digital predistortion on the signal components using a sampling rate corresponding to a sampling bandwidth that is larger than any individual one of the different frequency bands for the multiple signal portions, but smaller than a total input bandwidth for the input signal comprising the multiple signal portions.

As noted, the excluded at least some basis functions may include cross-terms basis functions for two or more of multiple signal portions in the different frequency bands. In some embodiments, the excluded at least some basis functions may include cross-terms basis functions for the two or more of the multiple signal portions that are located at frequency locations outside a pre-determined frequency reference window. In another example, the excluded at least some basis functions may include cross-terms basis functions for the two or more of the multiple signal portions that are located at frequency locations outside a pre-determined frequency reference window, and have relative energy levels below a pre-determined energy threshold.

The signal components, derived from the multiple signal portions, may include one or more of, for example, individual separated parts of the multiple signal portions (e.g., the components $x_1, x_2, \ldots, x_n$ shown in FIG. 3), individual normalized parts of the multiple signal portions (the components $w_1, w_2, w_n$, shown in FIG. 3), and/or cross-term combinations of one or more of the individual parts of the multiple signal portions. Obtaining the individual separated parts of the multiple signal portions may be realized, in some implementations, by separating the multiple signal portions into the individual separated parts of the multiple signal portions. Separating the multiple signal portions into the individual separated parts may include, for example, applying one or more bandpass filters to the input signal to produce the individual separated parts (in some embodiments, individual bands may also be shifted to DC, while in other embodiments the predistortion operations can be performed on the separated bands at their relative frequencies within the overall band defining the aggregate input signal). Obtaining the normalized parts of the multiple signal portions may be achieved by computing the individual normalized parts of the multiple signal portions according to:

$$w_j = x_j \frac{1}{\left(\sum_{k=1}^{n} |x_k|^2\right)^p}$$

with $x_j$ being one of n individual parts of the multiple signal portions of the input signal, and with p including a fractional exponent selected to yield good performance for an output of the transmit chain resulting from the produced digital predistorted signal. For example, p may be set to a value of 0.5, 0.21, or any other value whose use can result in good DPD behavior and results.

In some embodiments, performing the digital predistortion may include computing digital predistortion coefficients to weigh the reduced set of basis functions. In such embodiments, computing the digital predistortion coefficients may include deriving a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components. The procedure 400 may also include, in such embodiments, applying the input values of the signal components to the respective first group of the basis function terms, weighed by the first group of digital predistortion coefficients, to produce first resultant signals, applying the normalized input values of the signal components to the respective second group of basis functions, weighed by the second group of digital predistortion coefficients, to produce second resultant signals, applying the input values of the combinations of the signal components to the respective third group of basis functions, weighed by the third group of digital predistortion coefficients, to produce third resultant signals, and combining the first resultant signals, the second resultant signals, and the third resultant signals to produce the digital predistorted signal.

In some implementations, computing the digital predistortion coefficients may include periodically computing the digital predistortion coefficients used to weigh the reduced set of basis function terms. In some examples, periodically computing the digital predistortion coefficients may include periodically computing the digital predistortion coefficients that result in a minimization of a difference between amplified values of one or more instances of the signal components, and observed output signals of the transmit chain resulting from inputting into the transmit chain a resultant signal produced by weighing the reduced set of the basis functions by the computed digital predistortion coefficients and applying to the weighed reduced set of the basis functions the one or more instances of the signal components. Other techniques to compute the digital predistortion coefficients/parameters (e.g., other optimization techniques) may be used.

Figure 5:
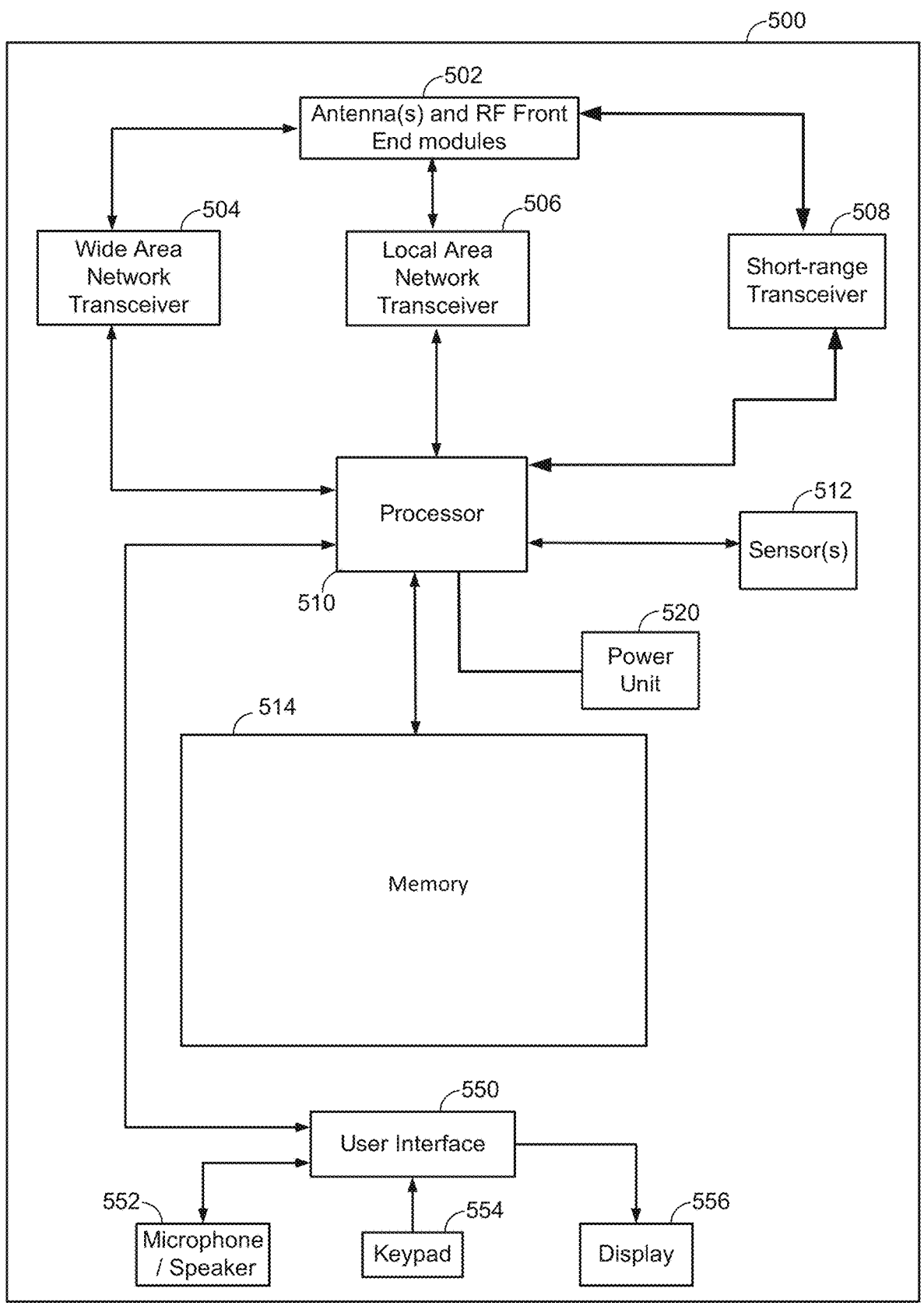
FIG. 5 is an example device configured to perform multi-band linearization operations.

With reference next to FIG. 5, a schematic diagram of an example device 500 (e.g., a mobile device or handset, a network node, such as a WLAN access point or a WWAN base station, a server on which a multi-band predistortion procedure, such as the procedures described herein, is executed, etc.), which may be used to implement, or which may include, the multi-band digital predistortion implementations described herein in relation to FIGS. 1-4 and 6-7, is shown. It is to be noted that one or more of the modules and/or functions illustrated in the example device of FIG. 5 may be further subdivided, or two or more of the modules or functions illustrated in FIG. 5 may be combined. Additionally, one or more of the modules or functions illustrated in FIG. 5 may be excluded.

As shown, the example device 500 may include a communication module comprising one or more transceivers (e.g., a WLAN transceiver 506, a WWAN transceiver 504, a short-range transceiver 508, etc.) that may be connected to one or more antennas and RF front end modules (illustrated as block 502). The RF front end circuitry of the block 502 may include power amplifiers, LNAs, digital-to-analog converters, analog-to-digital converters, switches, filters (e.g., bandpass filters), and other RF front-end modules, and, in some embodiments, at least some of the RF front end modules may be arranged to realize, at least in part, the system implementations 100, 300, or 600 described herein. The transceivers 504, and 506, and/or 508 may comprise suitable devices, hardware, and/or software for communicating with and/or detecting signals to/from a network or remote devices. In some embodiments, the transceiver 506 may support wireless LAN communication (e.g., WLAN, such as WiFi-based communications) to thus cause the device 500 to be part of a WLAN. Any type of WLAN-based protocol may be supported by the transceiver 506. In some embodiments, the transceiver 504 may support the device 500 to communicate with one or more cellular access points (also referred to as a base station), which may be used for wireless voice and/or data communication. The transceiver 504 may be used to communicate according to any type of WWAN protocol, including any 3GPP or IEEE standards (implemented over licensed and unlicensed frequency bands), including pre-5G and 5G New Radio (NR) communication protocols/technologies. In some variations, the device 500 may also include the near-range transceiver (interface) 508 configured to allow the device 500 to communicate with in-range remote devices configured according to any near-range communication protocol. In addition, the device 500 may also include a wired network connection (e.g., implemented using a USB port, or some other wired port) to communicate with another device.

The device 500 may include one or more sensors 512 that communicate with a controller/processor 510 through wired or wireless communication links. The one or more sensors 512 may include motion/orientation sensors, an audio sensor (e.g., a microphone), a camera or some other type of optical sensors (e.g., a charge-couple device (CCD)-type camera, a CMOS-based image sensor, etc., which may produce still or moving images that may be displayed on a user interface device), and/or other types of sensors.

The controller/processor 510 may be connected to the transceivers 504, 506, and/or 508, and the one or more sensors 512. The processor may include one or more microprocessors, microcontrollers, and/or digital signal processors that provide processing functions, as well as other computation and control functionality. The device 500 may also include special purpose logic circuitry, e.g., an FPGA (field programmable gate array), an ASIC (application-specific integrated circuit), a DSP processor, a graphics processing unit (GPU), an accelerated processing unit (APU), an application processor, customized dedicated circuitry, etc., to implement, at least in part, the processes and functionality for the device 500. The processor 510 may also include memory 514 (computer accessible storage medium) for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The device 500 may be configured to (e.g., via hardware resident in the device and/or software modules/applications provided on the memory 514) to implement multi-band digital predistortion processing, including the procedures depicted in FIG. 4 (e.g., to perform digital predistortion, on signal components derived from multiple signal portions of the input signal, using respective groups of basis functions that exclude basis function groups for certain terms, such as cross-terms at points outside some pre-defined bandwidth). The memory 514 may be on-board the controller/processor 510 (e.g., within the same IC package), and/or may be external memory to the processor and coupled thereto over a data bus.

The example device 500 may further include a user interface 550 which provides any suitable interface systems, such as a microphone/speaker 552, keypad or touchscreen 554 (or some other user-interface input mechanism), and display 556 that allows user interaction with the device 500. Such a user-interface, be it an audiovisual interface (e.g., a display and speakers), or some other type of interface (visual-only, audio-only, tactile, etc.), configured to provide status data, alert data, and so on, to a user using the device 500. The microphone/speaker 552 provides for voice communication functionality, and may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker 552 or to the processor 510 of the device of FIG. 5. The keypad 554 includes suitable buttons for user input. The display 556 includes any suitable display, such as, for example, a backlit LCD display, and may further include a touch screen display for additional user input modes. The device 500 may further include a power unit 520 such as one or more batteries and/or a power conversion module that receives and regulates power from an outside source (e.g., AC power).

The above implementations, as illustrated in FIGS. 1-7, are applicable to a wide range of technologies that include RF technologies (including WWAN technologies, such as cellular technologies, and WLAN technologies), satellite communication technologies, cable modem technologies, wired network technologies, optical communication technologies, and all other RF and non-RF communication technologies. The implementations described herein encompass all techniques and embodiments that pertain to use of multiband digital predistortion in various different communication systems.

In some implementations, a computer accessible non-transitory storage medium includes a database (also referred to a "design structure" or "integrated circuit definition dataset") representative of a system including some or all of the components of the multi-band digital predistortion implementations of the systems described herein. Generally speaking, a computer accessible storage medium may include any non-transitory storage media accessible by a computer during use to provide instructions and/or data to the computer. For example, a computer accessible storage medium may include storage media such as magnetic or optical disks and semiconductor memories. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represents the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, the database may itself be the netlist (with or without the synthesis library) or the data set.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for digital predistortion of multiband signals, the method comprising:
   receiving an input signal comprising multiple signal portions in different frequency bands, the input signal configured to be processed by a transmit chain of a power amplification system with the transmit chain comprising at least a power amplifier that produces output with non-linear distortions, wherein the non-linear distortions of the transmit chain are represented using a set of basis functions derived according to a single-band model of the non-linear distortions; and
   performing digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain;
   wherein performing the digital predistortion comprises computing digital predistortion coefficients to weigh the reduced set of basis functions, including deriving a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components.

2. The method of claim 1, wherein performing the digital predistortion on the signal components derived from the multiple signal portions of the input signal using the reduced set of the basis functions comprises:
   performing the digital predistortion on the signal components using a sampling rate corresponding to a sampling bandwidth that is larger than any individual one of the different frequency bands for the multiple signal portions, but smaller than a total input bandwidth for the input signal comprising the multiple signal portions.

3. The method of claim 1, wherein the excluded at least some resultant basis functions comprise cross-terms basis functions for two or more of the multiple signal portions in the different frequency bands.

4. The method of claim 3, wherein the excluded at least some basis functions include the cross-terms basis functions for the two or more of the multiple signal portions that are located at frequency locations outside a pre-determined frequency reference window.

5. The method of claim 3, wherein the excluded at least some basis functions include the cross-terms basis functions for the two or more of the multiple signal portions that are located at frequency locations outside a pre-determined frequency reference window, and have relative energy levels below a pre-determined energy threshold.

6. The method of claim 1, wherein the signal components comprise one or more of: individual separated parts of the multiple signal portions, individual normalized parts of the multiple signal portions, or cross-term combinations of one or more of the individual parts of the multiple signal portions.

7. The method of claim 6, further comprising:
   separating the multiple signal portions into the individual separated parts of the multiple signal portions.

8. The method of claim 7, wherein separating the multiple signal portions into the individual separated parts comprises:
   applying one or more bandpass filters to the input signal to produce the individual separated parts.

9. The method of claim 6, further comprising:
   computing the individual normalized parts of the multiple signal portions according to:

$$w_j = x_j \frac{1}{\left(\sum_{k=1}^{n} |x_k|^2\right)^p}$$

wherein $x_j$ is one of n individual parts of the multiple signal portions of the input signal, and wherein p includes a fractional exponent selected to yield good performance for an output of the transmit chain resulting from the produced digital predistorted signal.

10. The method of claim 1, further comprising:
   applying the input values of the signal components to the respective first group of the basis function terms, weighed by the first group of digital predistortion coefficients, to produce first resultant signals;
   applying the normalized input values of the signal components to the respective second group of basis functions, weighed by the second group of digital predistortion coefficients, to produce second resultant signals;

applying the input values of the combinations of the signal components to the respective third group of basis functions, weighed by the third group of digital predistortion coefficients, to produce third resultant signals; and combining the first resultant signals, the second resultant signals, and the third resultant signals to produce the digital predistorted signal.

11. The method of claim 1, wherein computing the digital predistortion coefficients comprises:

periodically computing the digital predistortion coefficients used to weigh the reduced set of basis function terms.

12. The method of claim 11, wherein periodically computing the digital predistortion coefficients comprises:

periodically computing the digital predistortion coefficients that result in a minimization of a difference between amplified values of one or more instances of the signal components, and observed output signals of the transmit chain resulting from inputting into the transmit chain a resultant signal produced by weighing the reduced set of the basis functions by the computed digital predistortion coefficients and applying to the weighed reduced set of the basis functions the one or more instances of the signal components.

13. The method of claim 1, wherein performing digital predistortion on the signals components derived from the multiple signal portions of the input signal comprises:

excluding basis functions for cross-terms outside a pre-determined bandwidth, and retaining individual separated parts basis functions outside the pre-determined bandwidth, the individual separated parts basis function computed from individual parts of the multiple signal portions that are each located in a single respective frequency band from the different frequency bands.

14. A system for digital predistortion of multiband signals, the system comprising:

a power amplification system comprising a transmit chain including at least a power amplifier that produces output with non-linear distortions, wherein the non-linear distortions of the transmit chain are represented using a set of basis functions derived according to a single-band model of the non-linear distortions; and a controller to perform digital predistortion on signal components derived from multiple signal portions of an input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain;

wherein the controller configured to perform the digital predistortion is configured to compute digital predistortion coefficients to weight the reduced set of basis functions, including to derive a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components.

15. The system of claim 14, wherein the excluded at least some resultant basis functions comprise cross-terms basis functions for two or more of the multiple signal portions in the different frequency bands.

16. The system of claim 15, wherein the excluded at least some basis functions include the cross-terms basis functions for the two or more of the multiple signal portions that are located at frequency locations outside a pre-determined frequency reference window.

17. The system of claim 14, wherein the signal components comprise one or more of: individual separated parts of the multiple signal portions, individual normalized parts of the multiple signal portions, or cross-term combinations of one or more of the individual parts of the multiple signal portions.

18. The system of claim 17, wherein the controller is further configured to:

compute the individual normalized parts of the multiple signal portions according to:

$$w_j = x_j \frac{1}{\left(\sum_{k=1}^{n} |x_k|^2\right)^p}$$

wherein $x_j$ is one of n individual parts of the multiple signal portions of the input signal, and wherein p includes a fractional exponent selected to yield good performance for an output of the transmit chain resulting from the produced digital predistorted signal.

19. The system of claim 14, wherein the controller configured to perform the digital predistortion on the signal components derived from the multiple signal portions of the input signal using the reduced set of the basis functions is configured to:

perform the digital predistortion on the signal components using a sampling rate corresponding to a sampling bandwidth that is larger than any individual one of the different frequency bands for the multiple signal portions, but smaller than a total input bandwidth for the input signal comprising the multiple signal portions.

20. The system of claim 14, wherein the controller configured to perform digital predistortion on the signals components derived from the multiple signal portions of the input signal is configured to:

exclude basis functions for cross-terms outside a pre-determined bandwidth, and retaining individual separated parts basis functions outside the pre-determined bandwidth, the individual separated parts basis function computed from individual parts of the multiple signal portions that are each located in a single respective frequency band from the different frequency bands.

21. A design structure encoded on a non-transitory machine-readable medium, said design structure comprising elements that to be processed in a computer-aided design system, to generate a machine-executable representation of a multiband predistorter, the multiband predistorter comprising: a power amplification circuit comprising a transmit chain including at least a power amplifier that produces output with non-linear distortions, wherein the non-linear distortions of the transmit chain are represented using a set of basis functions derived according to a single-band model of the non-linear distortions; and a control circuit to perform digital predistortion on signal components derived from multiple signal portions of an input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain;

wherein the control circuit configured to perform the digital predistortion is configured to compute digital predistortion coefficients to weight the reduced set of basis functions, including to derive a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components.

22. A non-transitory computer readable media programmed with instructions, executable on a processor, to:

receive an input signal comprising multiple signal portions in different frequency bands, the input signal configured to be processed by a transmit chain of a power amplification system with the transmit chain comprising at least a power amplifier that produces output with non-linear distortions, wherein the non-linear distortions of the transmit chain are represented using a set of basis functions derived according to a single-band model of the non-linear distortions; and perform digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain;

wherein the instructions to perform the digital predistortion include one or more instructions to compute digital predistortion coefficients to weight the reduced set of basis functions, including to derive a first group of coefficients for a first group of the basis function terms operating on input values of the signal components, a second group of coefficients for a second group of basis function terms operating on normalized input values of the signal components, and a third group of coefficients for a third group of basis function terms operating on input values of combinations of the signal components.

23. A method for digital predistortion of multiband signals, the method comprising:

receiving an input signal comprising multiple signal portions in different frequency bands, the input signal configured to be processed by a transmit chain of a power amplification system with the transmit chain comprising at least a power amplifier that produces output with non-linear distortions, wherein the non-linear distortions of the transmit chain are represented using a set of basis functions derived according to a single-band model of the non-linear distortions; and performing digital predistortion on signal components derived from the multiple signal portions of the input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain;

wherein the signal components comprise individual normalized parts of the multiple signal portions;

and wherein the method further includes computing the individual normalized parts of the multiple signal portions according to:

$$w_j = x_j \frac{1}{\left(\sum_{k=1}^{n} |x_k|^2\right)^p}$$

wherein $x_j$ is one of n individual parts of the multiple signal portions of the input signal, and wherein p includes a fractional exponent selected to yield good performance for an output of the transmit chain resulting from the produced digital predistorted signal.

24. The method of claim 23, wherein performing the digital predistortion on the signal components derived from the multiple signal portions of the input signal using the reduced set of the basis functions comprises:

performing the digital predistortion on the signal components using a sampling rate corresponding to a sampling bandwidth that is larger than any individual one of the different frequency bands for the multiple signal portions, but smaller than a total input bandwidth for the input signal comprising the multiple signal portions.

25. The method of claim 23, wherein the excluded at least some resultant basis functions comprise cross-terms basis functions for two or more of the multiple signal portions in the different frequency bands.

26. The method of claim 25, wherein the excluded at least some basis functions include the cross-terms basis functions for the two or more of the multiple signal portions that are located at frequency locations outside a pre-determined frequency reference window, and have relative energy levels below a pre-determined energy threshold.

27. The method of claim 23, wherein the signal components further comprise one or more of: individual separated parts of the multiple signal portions, or cross-term combinations of one or more of the individual parts of the multiple signal portions, and wherein the method further comprises:

separating the multiple signal portions into the individual separated parts of the multiple signal portions, including applying one or more bandpass filters to the input signal to produce the individual separated parts.

28. The method of claim 23, wherein computing the digital predistortion coefficients comprises:

periodically computing the digital predistortion coefficients used to weigh the reduced set of basis function terms.

29. The method of claim 23, wherein performing digital predistortion on the signals components derived from the multiple signal portions of the input signal comprises:

excluding basis functions for cross-terms outside a pre-determined bandwidth, and retaining individual separated parts basis functions outside the pre-determined bandwidth, the individual separated parts basis function computed from individual parts of the multiple signal portions that are each located in a single respective frequency band from the different frequency bands.

30. A system for digital predistortion of multiband signals, the system comprising:

a power amplification system comprising a transmit chain including at least a power amplifier that produces output with non-linear distortions, wherein the non-linear distortions of the transmit chain are represented using a set of basis functions derived according to a single-band model of the non-linear distortions; and a controller to perform digital predistortion on signal components derived from multiple signal portions of an input signal using a reduced set of the basis functions that excludes at least some basis functions for at least some cross-terms resulting from a full expansion of the single-band model of the non-linear distortions applied to the multiple signal portions, to produce a digital predistorted signal provided to the transmit chain;

wherein the signal components comprise individual normalized parts of the multiple signal portions;

and wherein the controller is further configured to compute the individual normalized parts of the multiple signal portions according to:

$$w_j = x_j \frac{1}{\left(\sum_{k=1}^{n} |x_k|^2\right)^p}$$

wherein $x_j$ is one of n individual parts of the multiple signal portions of the input signal, and wherein p includes a fractional exponent selected to yield good performance for an output of the transmit chain resulting from the produced digital predistorted signal.

31. The system of claim 30, wherein the excluded at least some resultant basis functions comprise cross-terms basis functions for two or more of the multiple signal portions in the different frequency bands.

32. The system of claim 31, wherein the excluded at least some basis functions include the cross-terms basis functions for the two or more of the multiple signal portions that are located at frequency locations outside a pre-determined frequency reference window, and have relative energy levels below a pre-determined energy threshold.

33. The system of claim 30, wherein the controller configured to perform the digital predistortion on the signal components derived from the multiple signal portions of the input signal using the reduced set of the basis functions is configured to:

perform the digital predistortion on the signal components using a sampling rate corresponding to a sampling bandwidth that is larger than any individual one of the different frequency bands for the multiple signal portions, but smaller than a total input bandwidth for the input signal comprising the multiple signal portions.

34. The system of claim 30, wherein the signal components further comprise one or more of: individual separated parts of the multiple signal portions, or cross-term combinations of one or more of the individual parts of the multiple signal portions, and wherein the controller is further configured to:

separate the multiple signal portions into the individual separated parts of the multiple signal portions, including to apply one or more bandpass filters to the input signal to produce the individual separated parts.

35. The system of claim 30, wherein the controller configured to perform digital predistortion on the signals components derived from the multiple signal portions of the input signal is configured to:

exclude basis functions for cross-terms outside a pre-determined bandwidth, and retaining individual separated parts basis functions outside the pre-determined bandwidth, the individual separated parts basis function computed from individual parts of the multiple signal portions that are each located in a single respective frequency band from the different frequency bands.

* * * * *